US012071750B2

(12) United States Patent
Farmer

(10) Patent No.: US 12,071,750 B2
(45) Date of Patent: Aug. 27, 2024

(54) ADJUSTABLE COVERING TRIM FOR A CONCEALED VALVE AND ARTICULATED ADAPTOR

(71) Applicant: DISTRIBUTION AD WATERS (CAN) INC., Montreal (CA)

(72) Inventor: Jacques Farmer, L'lle Bizard (CA)

(73) Assignee: DISTRIBUTION AD WATERS (CAN) INC., Montreal (CA)

( * ) Notice: Subject to any disclaimer, the term of this patent is extended or adjusted under 35 U.S.C. 154(b) by 0 days.

(21) Appl. No.: 17/773,023

(22) PCT Filed: Oct. 28, 2020

(86) PCT No.: PCT/CA2020/051443
§ 371 (c)(1),
(2) Date: Apr. 28, 2022

(87) PCT Pub. No.: WO2021/081638
PCT Pub. Date: May 6, 2021

(65) Prior Publication Data
US 2022/0389692 A1 Dec. 8, 2022

Related U.S. Application Data

(60) Provisional application No. 62/928,480, filed on Oct. 31, 2019.

(51) Int. Cl.
*E03C 1/04* (2006.01)
*E03C 1/02* (2006.01)
*F16K 31/60* (2006.01)

(52) U.S. Cl.
CPC .............. *E03C 1/04* (2013.01); *F16K 31/602* (2013.01); *E03C 2001/026* (2013.01); *F16K 2200/501* (2021.08)

(58) Field of Classification Search
CPC .. E03C 2201/50; E03C 1/04; E03C 2001/026; E03C 1/041; F16K 31/602; F16K 2200/501
See application file for complete search history.

(56) References Cited

U.S. PATENT DOCUMENTS 4,220,175 A  9/1980 Keller, III et al.
4,464,141 A  8/1984 Brown
(Continued)

FOREIGN PATENT DOCUMENTS

WO    2019-076672    4/2019

OTHER PUBLICATIONS

International Search Report and Written Opinion for App. No. PCT/CA2020/051443, dated Jun. 5, 2021.

*Primary Examiner* — Daphne M Barry
(74) *Attorney, Agent, or Firm* — Butzel Long

(57) ABSTRACT

The present disclosure relates to an adjustable covering trim for covering a valve concealed behind a finishing wall and which is adapted to accommodate different valve installations. The trim includes a decorative outer frame to be mounted on a finishing wall, a handle which is rotatably coupled thereon and an articulated cartridge adaptor or interface which can be releasably coupled with an internal surface of the hollow handle. The adaptor is further adapted to be mounted on a cartridge distal end of the valve so that both the cartridge distal end and the articulated cartridge adaptor can rotate with the hollow handle upon rotation of the hollow handle about a cartridge centerline. The articulated cartridge adaptor is articulable relatively to the cartridge centerline. The covering trim may further include a temperature control mechanism and means to easily mount a decorative cover to the finishing wall.

20 Claims, 26 Drawing Sheets

(56) References Cited

U.S. PATENT DOCUMENTS 7,509,971 B2 3/2009 Kajuch
2016/0298695 A1 10/2016 Parker

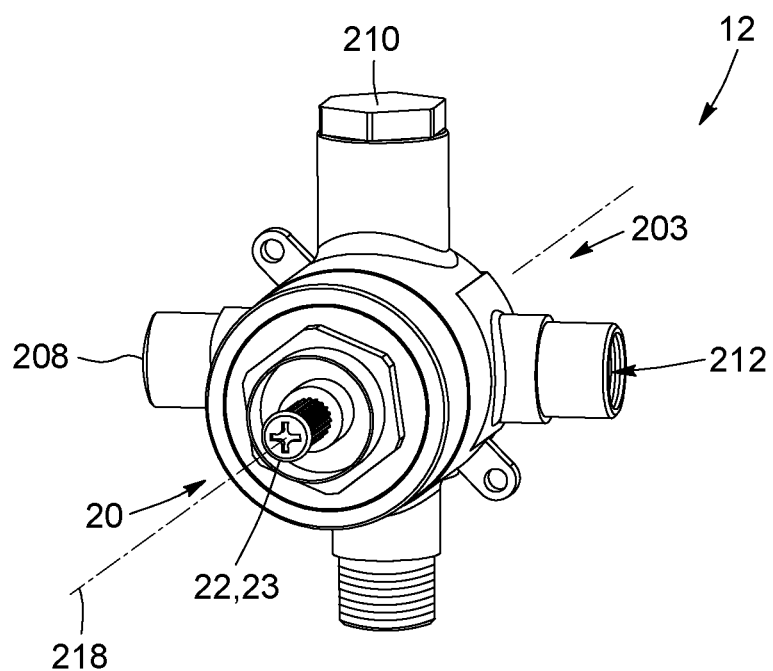
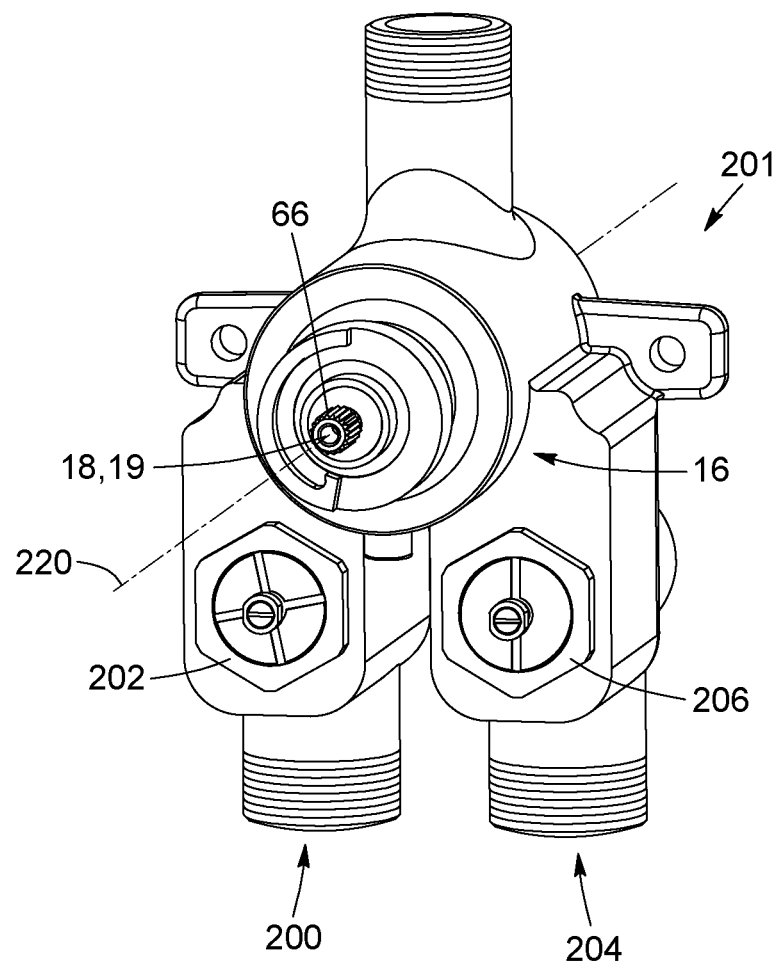
FIG. 2

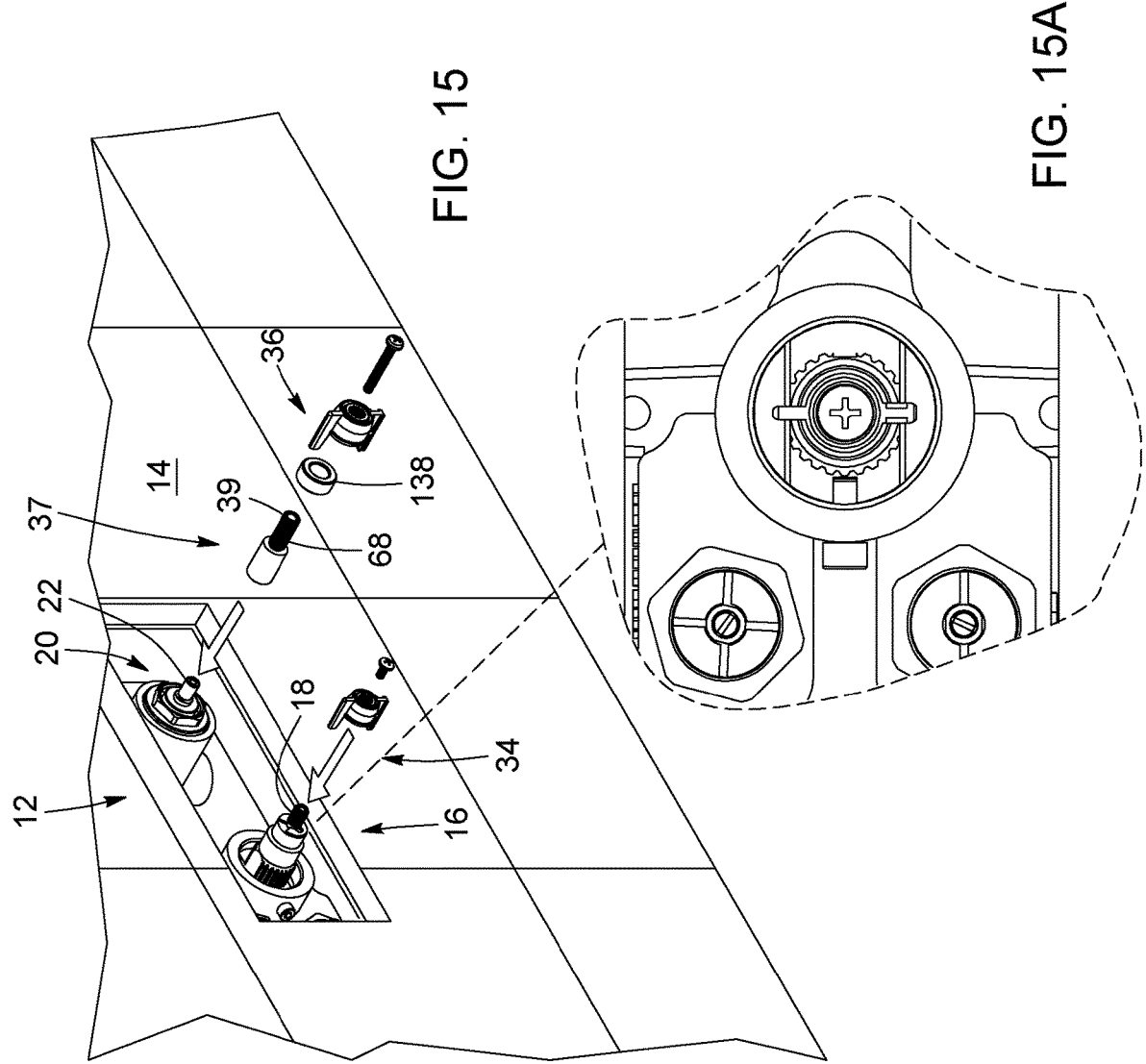

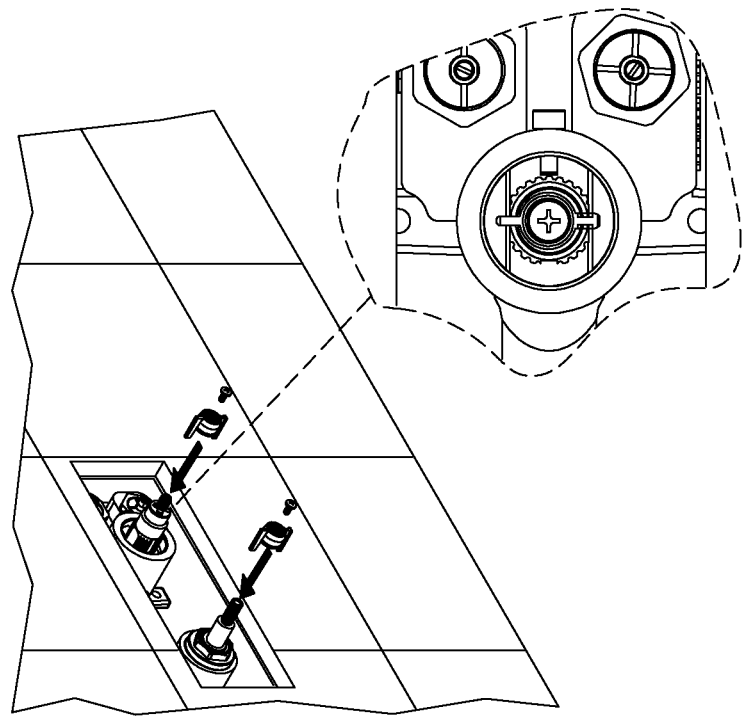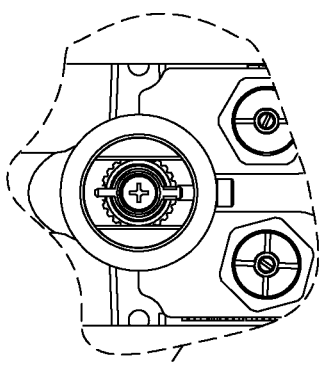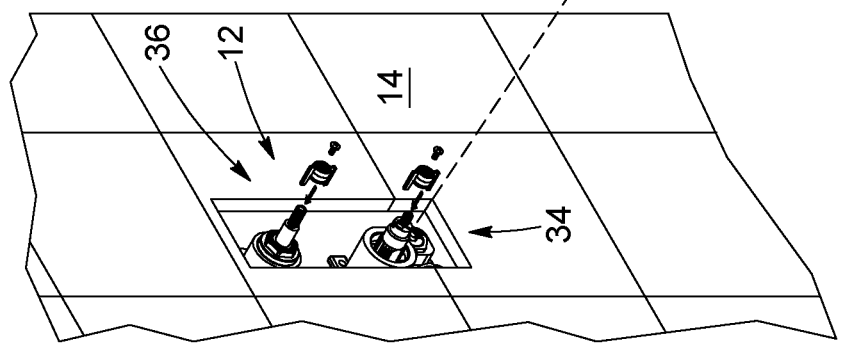

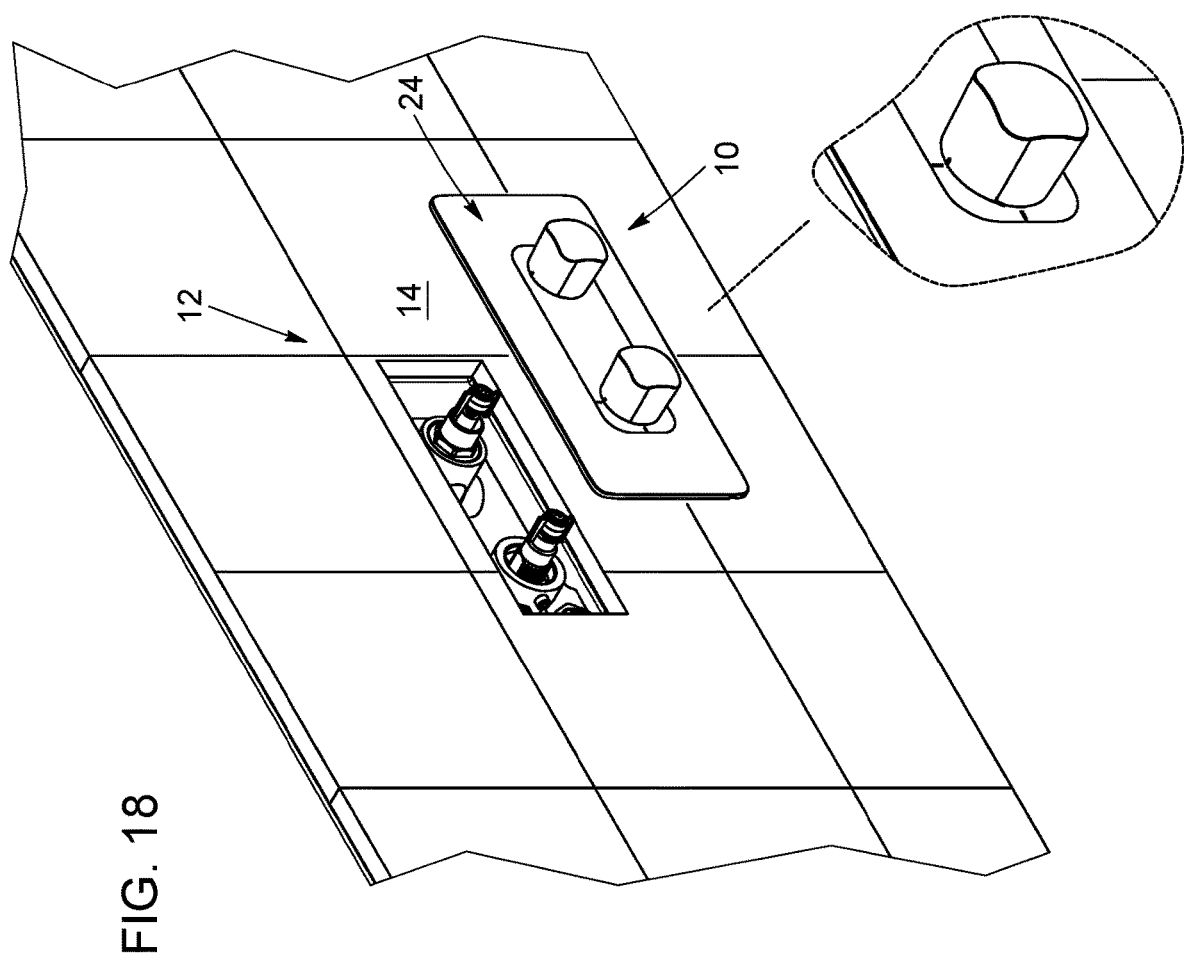

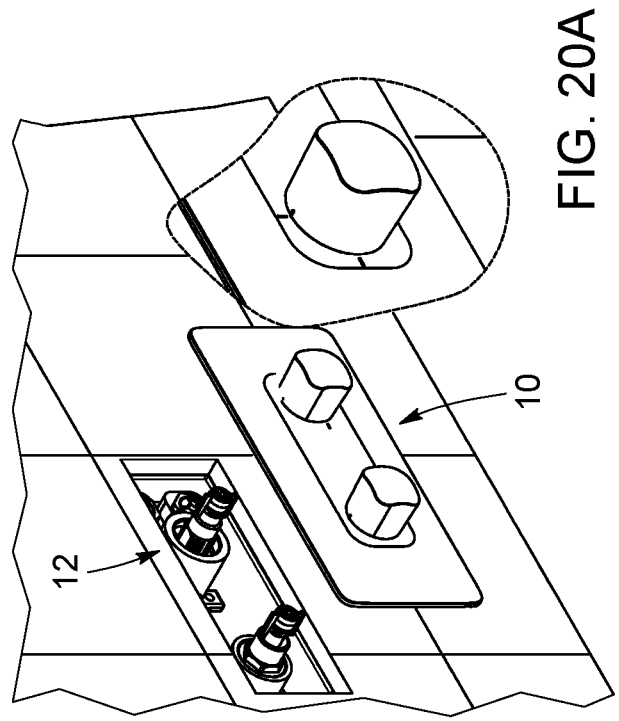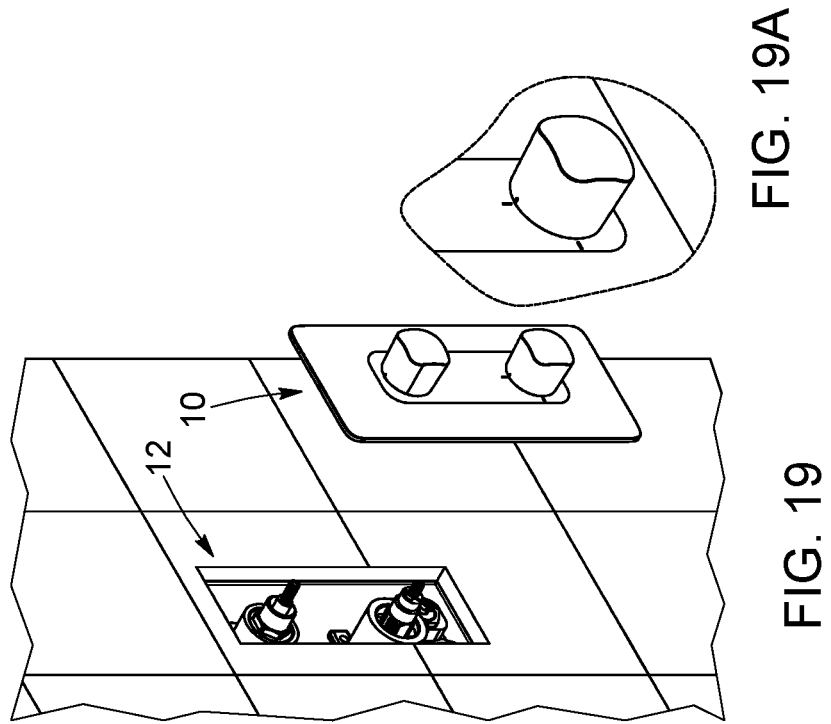

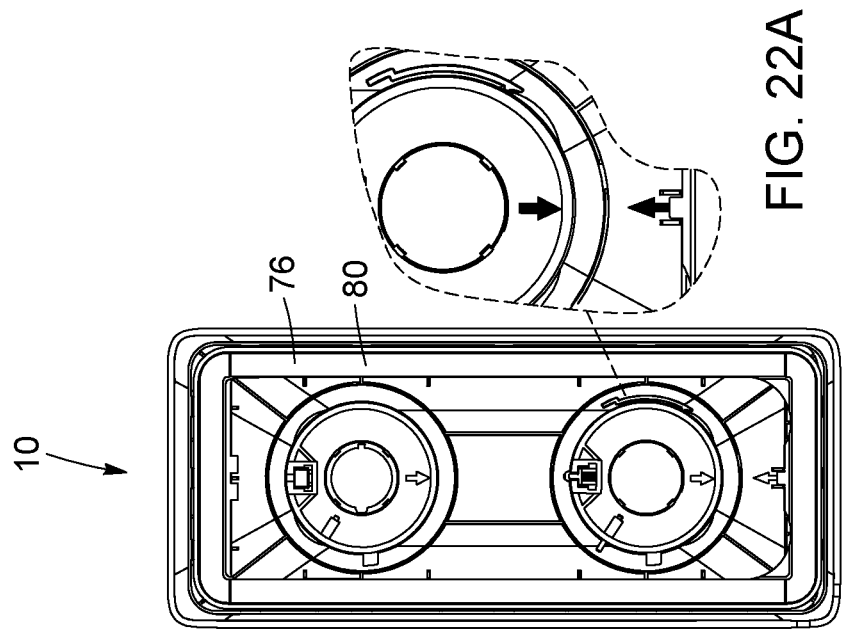
FIG. 22
FIG. 22A
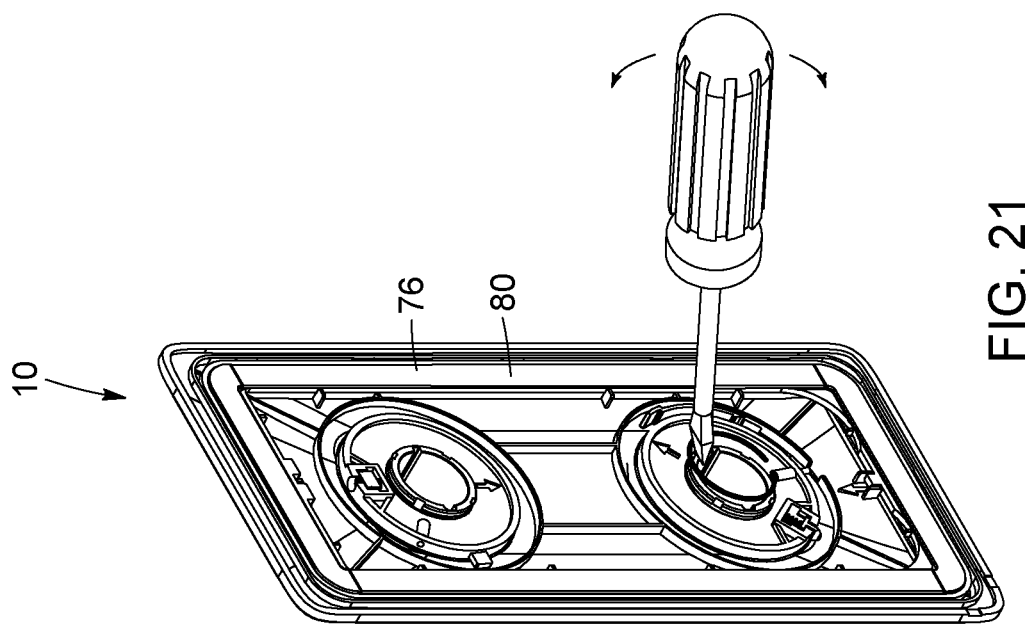
FIG. 21

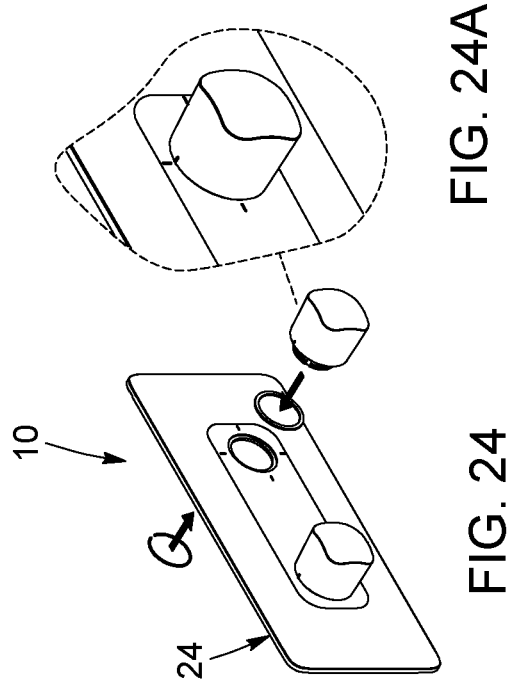
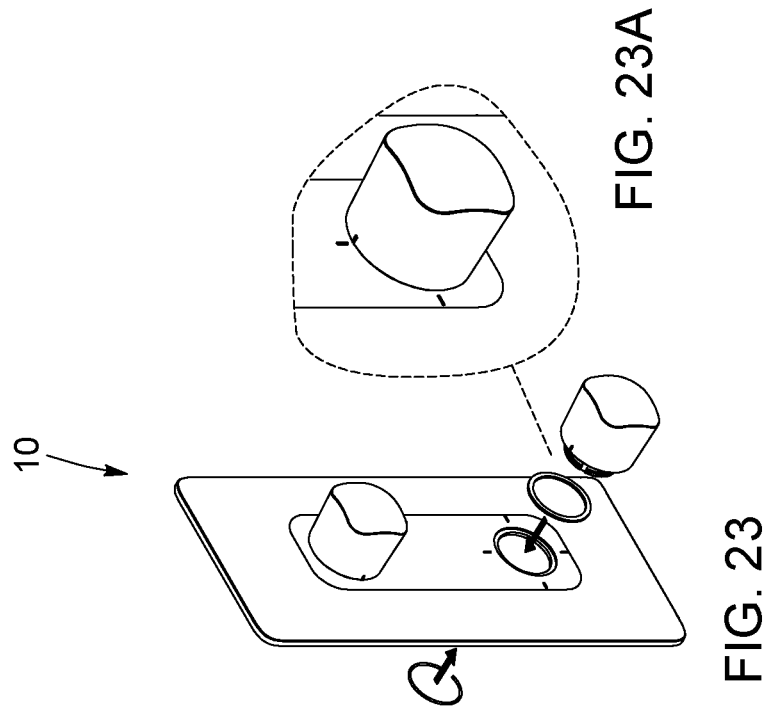

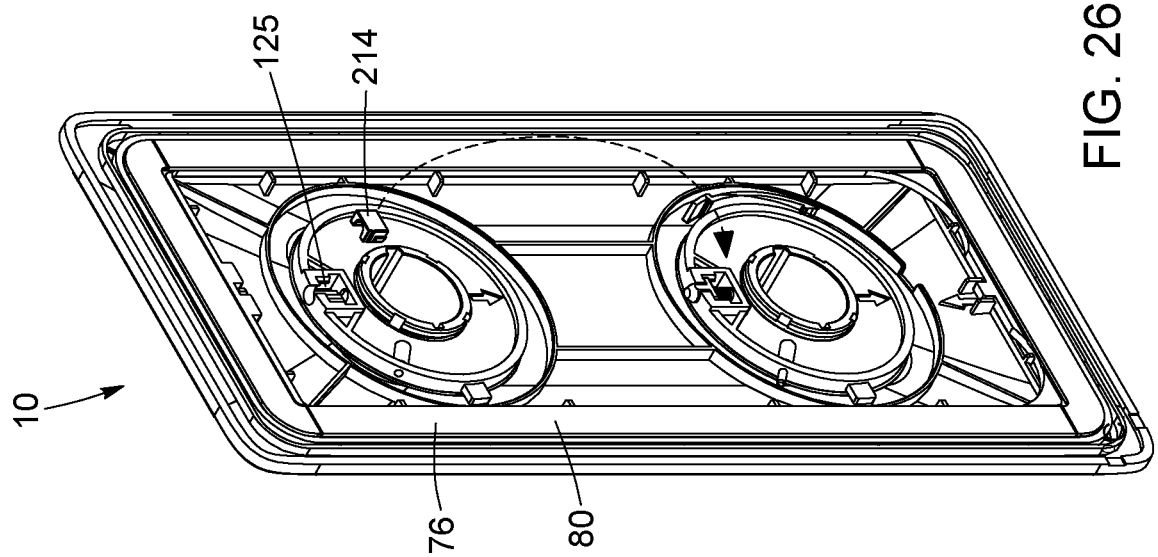
FIG. 26
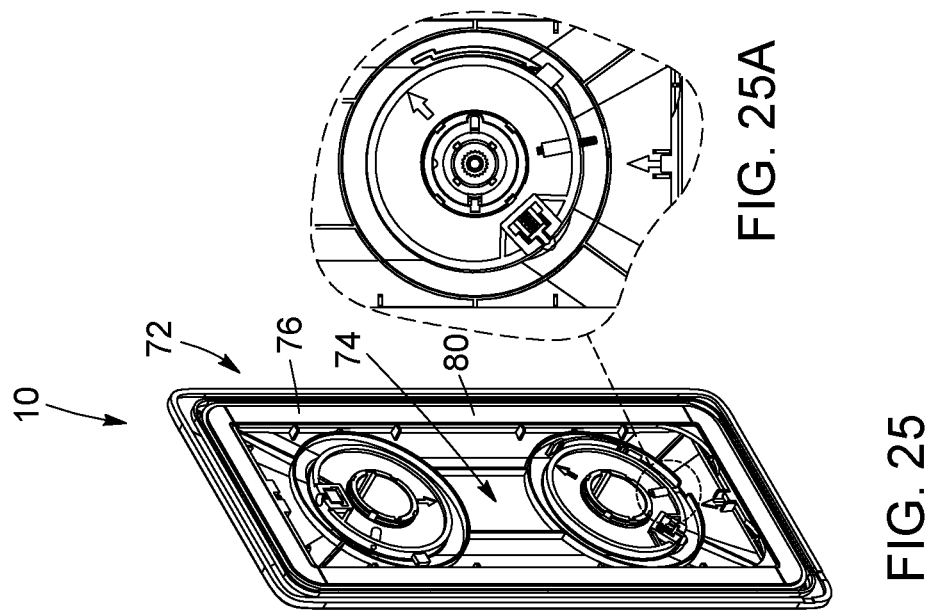
FIG. 25A
FIG. 25

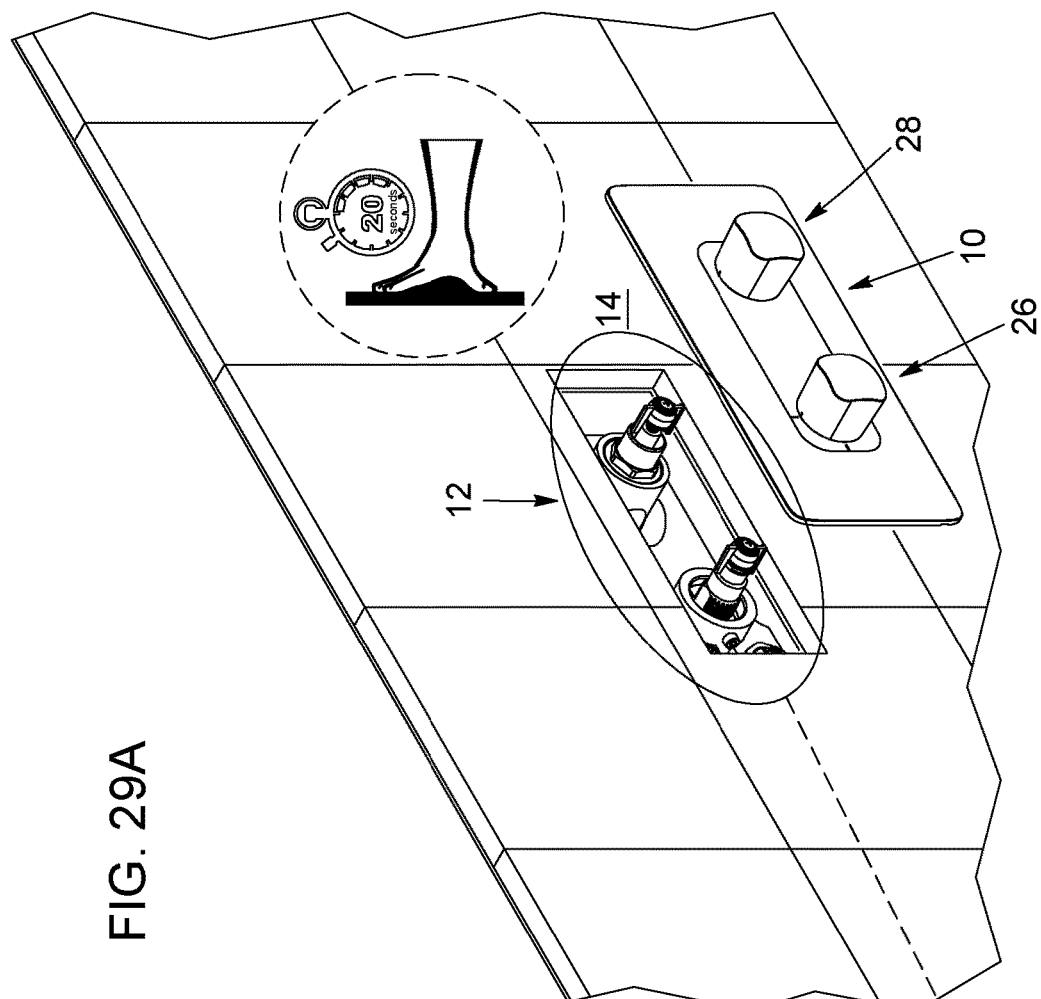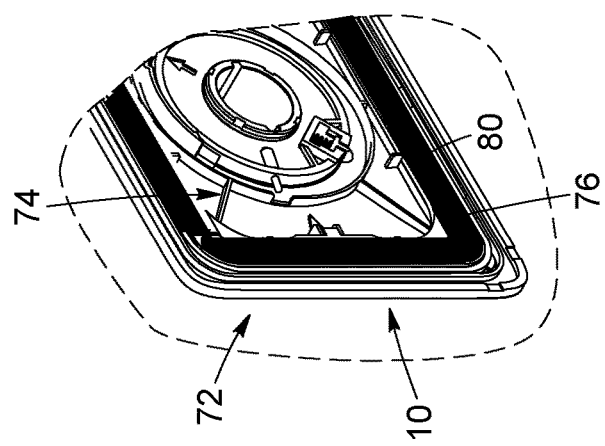

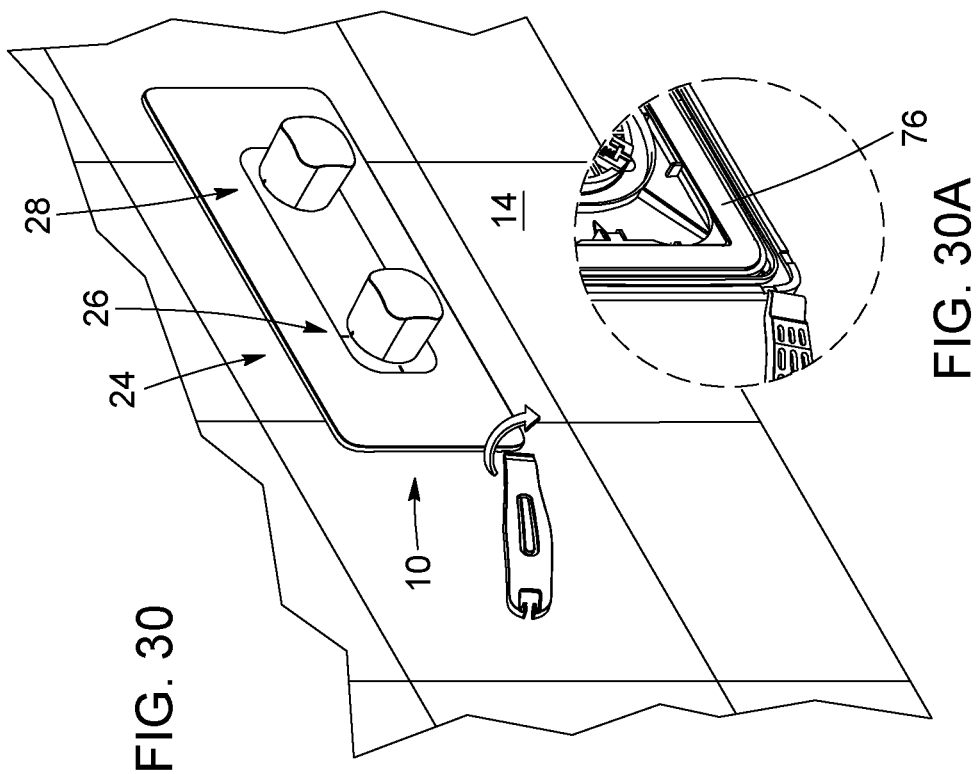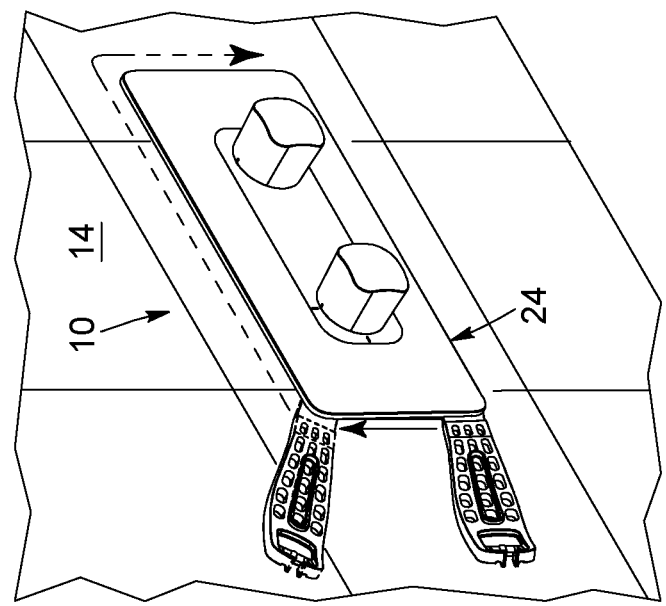

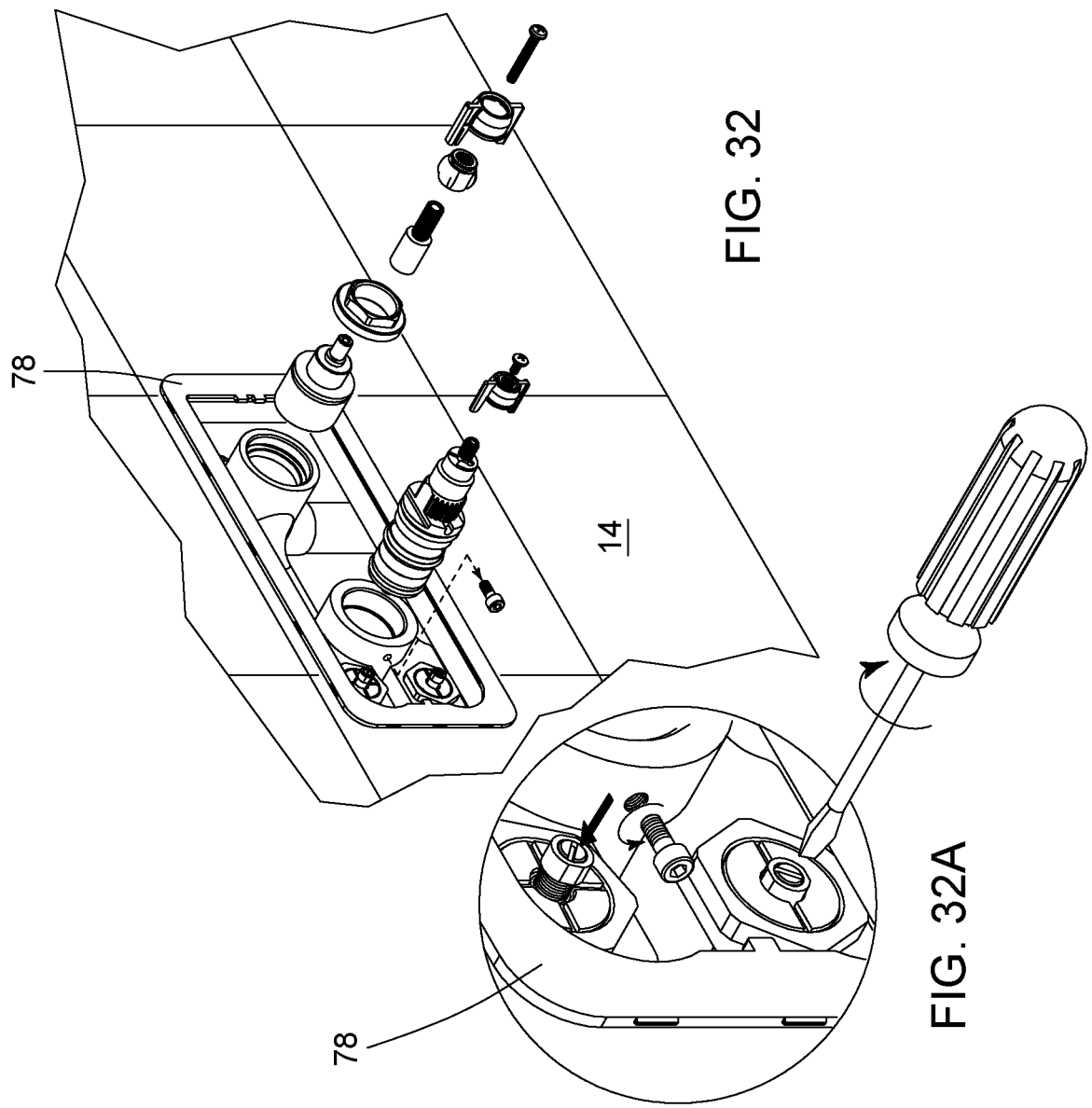

ized and configured to be mounted on the extending cartridge at the cartridge distal end such that both the cartridge distal end and the articulated cartridge adaptor can rotate with the handle upon rotation thereof, the articulated cartridge adaptor being articulable relative to the cartridge centerline.

ADJUSTABLE COVERING TRIM FOR A CONCEALED VALVE AND ARTICULATED ADAPTOR

CROSS-REFERENCE TO RELATED APPLICATION

This application claims benefit to U.S. Ser. No. 62/928,480, titled ADJUSTABLE COVERING TRIM FOR A CONCEALED VALVE AND METHOD OF INSTALLING THE SAME, which is incorporated herein in its entirety.

TECHNICAL FIELD

The present disclosure relates to the field of plumbing. More particularly, the present disclosure relates to covering trims for shower and/or bathtub concealed valves, which are easy to install and allow for greater freedom than current covering trims in conferring a desired visual appearance to showers and/or bathtubs. The present disclosure also relates to methods for installing covering trims and to methods for making the same.

BACKGROUND

One of the most reliable shower and/or bathtub set-ups is known to allow for precise control over water temperature by means of thermostatic valves. According to the relative position of the thermostatic valve in relation to the finishing wall, commercially available thermostatic valves can be classified into two main categories: unconcealed and concealed valves. Unconcealed valves such as the bar and the exposed valves sit external to the finishing wall, whereas concealed valves sit behind the finishing wall, leaving the thermostatic and volume or diverter control mechanisms, i.e., the cartridge ends exposed.

Despite the many commercially available solutions, adequately coupling a covering trim to a corresponding concealed valve (being thermostatic or not) to provide showers and/or bathtubs with a desired appearance by properly fitting, and/or interfacing with the finishing wall, continues to be a challenge, and that for at least two reasons. First, the depth at which the valve is installed behind the finishing wall differs from one installation site to another; and second, the thermostatic and/or diverter control mechanisms is/are oftentimes not installed perfectly perpendicular to the finishing wall.

Surprisingly, addressing the lack of perpendicularity between the finishing wall and the thermostatic and/or diverter control mechanisms appears to be a pending issue. When the covering trim is installed, the resulting visual appearance of the concerned shower and/or bathtub does not always meet customers' expectations.

In view of the above, there is therefore a need for an improved covering trim that can accommodate different valve installations and which, by virtue of its design and components, would be able to overcome or at least minimize some of the above-discussed concerns.

SUMMARY

It is an object of the present disclosure to provide a covering trim for a concealed valve that overcomes or mitigates one or more disadvantages of known trims, or at least provide useful alternatives.

According to one possible embodiment, there is provided an adjustable covering trim (or trim kit) for covering a valve concealed behind a finishing wall. The valve comprises an extending cartridge defining a cartridge distal end and a cartridge centerline extending therealong. The adjustable covering trim comprises a decorative outer frame mountable on the finishing wall and configured to cover the valve. The trim also comprises at least one handle rotatable relative to the decorative outer frame about an axis of rotation. The trim further comprises an articulated cartridge adaptor received within with the handle. The articulated cartridge adaptor is sized and configured to be mounted on the extending cartridge at the cartridge distal end such that both the cartridge distal end and the articulated cartridge adaptor can rotate with the handle upon rotation thereof, the articulated cartridge adaptor being articulable relative to the cartridge centerline.

In accordance with a possible embodiment, the articulated cartridge adaptor is shaped and configured to allow, when in use, for the handle to rotate the extending cartridge of the valve even if the axis of rotation of the handle is at angle with the cartridge centerline.

According to a preferred embodiment, the handle is hollow and defines a handle internal surface. The articulated cartridge adaptor is releasably coupleable with the handle internal surface and is releasably mountable to the distal end of the extending cartridge.

In accordance with a possible embodiment, the articulated cartridge adaptor comprises a first adaptor portion operatively connectable to the handle and a second adaptor portion mountable onto the cartridge distal end, the first and second adaptor portions being movable one relative to the other so as to compensate for a misalignment between the axis of rotation of the handle and the cartridge centerline.

According to a possible configuration, the first adaptor portion is an outer portion and the second adaptor portion is an inner portion, the inner portion being provided within the outer portion and being movable relative thereto along the cartridge centerline. Preferably, the outer portion and the inner portion are movable one relative to the other along at least three degrees of freedom.

In a possible configuration, the inner portion of the adaptor comprises an internal hollow member defining an internal hollow member passage for receiving the cartridge distal end therein; and the outer portion comprises an external hollow member; the internal hollow member being securely received within the external hollow member. The external hollow member defines an external hollow member centerline and the internal hollow member defines an internal hollow member centerline: the external hollow member is movable relatively to the internal hollow member such that an angle can be provided between the external hollow member centerline and the internal hollow member centerline.

According to a possible embodiment, the handle and the outer portion of the articulated cartridge adaptor comprise complementary connecting portions to secure the articulated cartridge adaptor to the handle. In a possible configuration, the complementary connecting portions comprises an external member protrusion provided within the handle or on the outer portion of the adaption, and a longitudinal groove is provided on the outer portion of the adaptor or handle, for slidably receiving the external member protrusion therein.

Similarly, the inner portion and the outer portions of the articulated cartridge adaptor comprise complementary connecting components, allowing movement of the inner portion relative to the outer portion. In a possible embodiment, the complementary connecting components comprises one or more protrusions and corresponding grooves, for movably receiving therein the protrusions.

In a possible embodiment of the trim, the decorative outer frame comprises a mounting frame mountable or connectable to the finishing wall, and a decorative cover, releasably mounted on the mounting frame. In a preferred embodiment, the decorative cover is sized and configured to be clipped onto the outer frame. Preferably, the decorative cover comprises a mounting frame channel for clipping the mounting frame therein.

In a possible embodiment, the mounting frame defines a mounting surface and a cover receiving surface opposite the mounting surface. The mounting frame may be provided with an adhesive material affixed to the mounting surface for allowing adhesion of the mounting frame on the finishing wall. In a possible embodiment, the mounting frame and the decorative cover comprise complementary tabs for securing the mounting frame and the decorative cover together.

In a possible embodiment, the handle can comprise a hollow handle decorative cover and a sleeve received within the hollow handle decorative cover. In this case, the sleeve defines an outer end and an inner end. A ring portion radially and outwardly extending from the inner end of the sleeve can be provided. The ring portion defines a cover interfacing surface, a valve interfacing surface and a peripheral edge joining the cover interfacing surface and the valve interfacing surface. It will be noted that the use of a sleeve is especially useful for handles made of plastic or of other polymeric material. However, when the handle is made of metal, the sleeve can be omitted, and the adaptor can interface directly with the internal surface of the handle.

In a possible embodiment of the trim, a temperature control mechanism can be provided. The temperature control mechanism can be provided partly on the handle and partly on the decorative outer frame. Components of the temperature control mechanism provided on the handle are configured to interact with components of the decorative outer frame, for controlling temperature of water coming out of the valve. In possible configurations, the complementary temperature control components of the decorative outer frame and of the handle are configured to set at least one maximum water temperature through their interaction. In possible embodiments, between two and four different preset water temperatures can be set, through interaction of the complementary control components.

According to a possible embodiment of the temperature control mechanism, the complementary temperature control components may comprise: an annular temperature control projection extending outwardly from an inner face of the decorative outer frame and a retractable element provided on the handle, which can slide along the annular projection and be blocked by at least one segment thereof, corresponding to the maximal temperature setting. The annular projection on the decorative outer frame can comprise different sections corresponding to different temperature settings. In yet another possible embodiment, the temperature control projection can define a resistance portion and a locking section for interacting with the retractable element, the locking section being spaced apart from the resistance section.

In accordance with a possible embodiment of the trim, the trim can include at least one decorative outer frame as described above, and two handles: a first hollow handle rotatably coupled to the decorative outer frame and configured to receive at least partly the thermostatic cartridge distal end and a second hollow handle rotatably coupled to the decorative outer frame and configured to receive at least partly the diverter cartridge distal end. The trim can include one or two articulated cartridge adaptor(s) releasably coupled with the first and/or second handles. A diverter cartridge extension can be provided, releasably coupled to the extending diverter cartridge. In this case, the diverter cartridge extension defines a diverter cartridge extension distal end; and an articulated adaptor can be releasably coupled with one of the handles, and is adapted to be mounted on the diverter cartridge extension at the diverter cartridge extension distal end such that the diverter cartridge distal end, the diverter cartridge extension distal end and the articulated diverter cartridge adaptor can rotate with said handle upon rotation thereof. It will be noted that for embodiments where two handles are provided, each can be associated with its own decorative outer frame. Also, the use of extensions is optional.

In possible embodiments, the trim may not necessarily comprise the adaptor, but may comprise one or more handles and the decorative outer frame, which comprises the mounting frame mountable on the finishing wall and the decorative cover releasably connectable or mountable on the mounting frame. In other possible embodiments, the trim may be provided with the improved temperature control mechanism, provided in part on the handle, and in part on the decorative outer frame, for controlling temperature of water coming out of the valve. As can be appreciated, different embodiments of the trim can comprise at least one of: the articulated adaptor; the releasably coupleable mounting frame and decorative cover; and the temperature control mechanism, provided with control components on the cover and handle. The trim can include any combination of these elements.

In accordance with another embodiment, there is provided the articulated bath or shower adaptor as defined above, which can be provided separately from the other components of the trim kit. As described above, the articulated bath or shower adaptor comprises a first adaptor portion connectable to the handle, and a second adaptor portion connectable to the cartridge distal end, wherein the outer portion and the inner portion are movable one relative to the other, to compensate for any misalignment between the centerline of the valve's extending end and the rotational axis of the handle, due for example to the unevenness of the finishing wall.

In accordance with another embodiment, there is provided the articulated bath or shower adaptor as defined above, wherein the handle is hollow and defines a handle internal surface; the articulated cartridge adaptor is releasably coupled with the handle internal surface and is releasably mounted to the distal end of the extending cartridge.

In accordance with another embodiment, there is provided the articulated bath or shower adaptor as defined above, wherein the inner portion comprises an internal hollow member defining an internal hollow member passage for receiving the cartridge distal end therein; and the outer portion comprises an external hollow member; the internal hollow member is securely received within the external hollow member.

In accordance with another embodiment, there is provided the articulated bath or shower adaptor as defined above, wherein the external hollow member defines an external hollow member centerline and the internal hollow member defines an internal hollow member centerline and further wherein the external hollow member is movable relatively to the internal hollow member such that an angle can be provided between the external hollow member centerline and the internal hollow member centerline.

In accordance with another embodiment, there is provided an adjustable covering trim for covering a thermostatic valve concealed behind a finishing wall, the thermostatic valve comprising an extending thermostatic cartridge defining a thermostatic cartridge distal end and a thermostatic cartridge centerline and an extending diverter cartridge defining a diverter cartridge distal end and a diverter cartridge centerline. The adjustable covering trim comprises a decorative outer frame for securely mounting on the finishing wall and configured to cover the thermostatic valve, a first hollow handle rotatably coupled to the decorative outer frame and configured to receive at least partly the thermostatic cartridge distal end, and a second hollow handle rotatably coupled to the decorative outer frame and configured to receive at least partly the diverter cartridge distal end, each one of the first and second hollow handles defining a handle internal surface. The adjustable covering trim further comprises an articulated thermostatic cartridge adaptor releasably coupled with the handle internal surface of the first hollow handle and being adapted to be mounted on the extending thermostatic cartridge at the thermostatic cartridge distal end such that both the thermostatic cartridge distal end and the articulated thermostatic cartridge adaptor can rotate with the first hollow handle upon rotation of the first hollow handle about the thermostatic cartridge centerline, the articulated thermostatic cartridge adaptor being articulable relatively to the thermostatic cartridge centerline. The adjustable covering trim also comprises a diverter cartridge extension releasably coupled to the extending diverter cartridge, the diverter cartridge extension defining a diverter cartridge extension distal end, and an articulated diverter cartridge adaptor releasably coupled with the handle internal surface of the second hollow handle and being adapted to be mounted on the diverter cartridge extension at the diverter cartridge extension distal end such that the diverter cartridge distal end, the diverter cartridge extension distal end and the articulated diverter cartridge adaptor can rotate with the second hollow handle upon rotation of the second hollow handle about the diverter cartridge centerline, the articulated diverter cartridge adaptor being articulable relatively to the diverter cartridge centerline.

In accordance with another embodiment, there is provided an adjustable covering trim for covering a valve concealed behind a finishing wall, where the valve comprises an extending cartridge defining a cartridge distal end and a cartridge centerline. The adjustable covering trim comprises a mounting frame for securely mounting on the finishing wall, a decorative cover releasably mounted on the mounting frame, and a hollow handle rotatably coupled to the decorative cover and configured to receive at least partly the cartridge distal end, the hollow handle defining a handle internal surface. The adjustable covering trim also comprises a cartridge adaptor releasably coupled with the handle internal surface and being adapted to be mounted on the extending cartridge at the cartridge distal end such that both the cartridge distal end and the articulated cartridge adaptor can rotate with the hollow handle upon rotation of the hollow handle about the cartridge centerline.

In accordance with another embodiment, there is provided an adjustable covering trim for covering a valve concealed behind a finishing wall, where the valve comprises an extending cartridge defining a cartridge distal end and a cartridge centerline. The adjustable covering trim comprises a decorative outer frame for securely mounting on the finishing wall and configured to cover the valve, a hollow handle rotatably coupled to the decorative cover and configured to receive at least partly the cartridge distal end, the hollow handle defining a handle internal surface, and a cartridge adaptor releasably coupled with the handle internal surface and being adapted to be mounted on the extending cartridge at the cartridge distal end such that both the cartridge distal end and the articulated cartridge adaptor can rotate with the hollow handle upon rotation of the hollow handle about the cartridge centerline. The adjustable covering trim also comprises a temperature control mechanism provided on the hollow handle, the temperature control mechanism being configured to interact with the decorative outer frame for controlling temperature of water coming out of the valve.

In accordance with another embodiment, there is provided an articulated bath or shower cartridge adaptor for operatively connecting a handle to a valve, the handle having an axis of rotation and the valve comprising a cartridge provided with a distal end having cartridge centerline passing therethrough The articulated cartridge adaptor comprises a first adaptor portion connectable to the handle, and a second adaptor portion mountable onto the cartridge distal end, the first and second adaptor portions being connected and being movable one relative to the other so as to compensate for a misalignment between the axis of rotation of the handle and the cartridge centerline.

Different combinations of the embodiments, configurations and/or elements described are possible and within the scope of the present invention.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIG. 2 is a front perspective view of a two-component thermostatic valve;

FIGS. 13 to 24 illustrate different installation and/or configuration steps that are performed in relation with the covering trim of FIG. 3;

FIG. 24A is a close-up view of a portion of FIG. 24, when the handle is installed.

FIGS. 25 and 26 illustrate different installation orientations of the thermostatic valve.

FIG. 25A is close-up view of a portion of FIG. 25;

FIG. 29 illustrates an installation step required to mount the covering trim on the finishing wall;

FIG. 29A is a closed-up view of the mounting frame of the adjustable covering trim prior to mounting decorative trim shown in FIG. 3;

FIGS. 30 to 32 illustrate possible steps to provide maintenance to the thermostatic valve.

DETAILED DESCRIPTION

Figure 1:
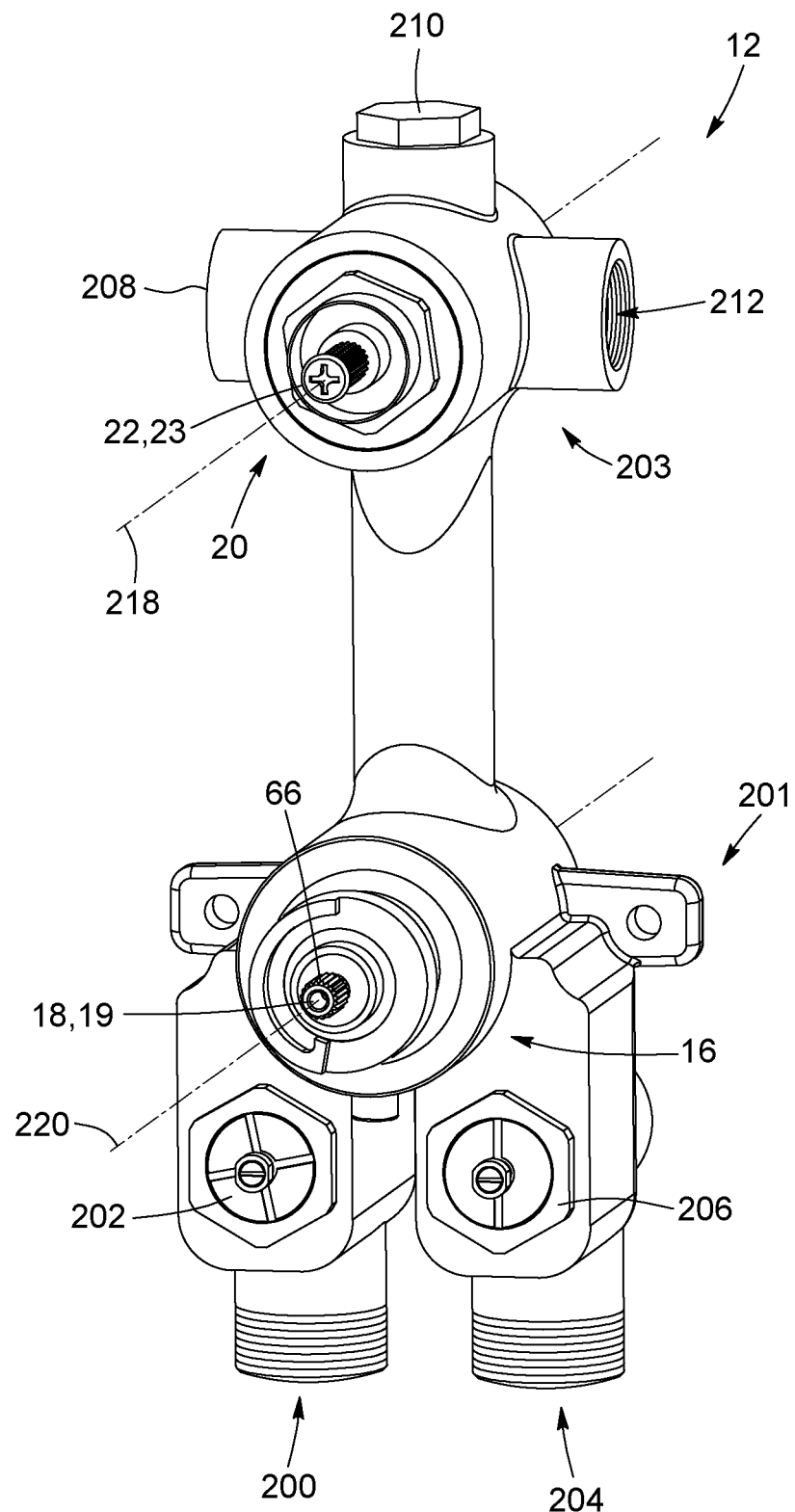
FIG. 1 is a front perspective view of a one-component thermostatic valve.

In the following description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures or described in the present disclosure are embodiments only, given solely for exemplification purposes.

Furthermore, in the context of the present description, it will be considered that all elongated objects will have an implicit "longitudinal axis" or "centerline", such as the longitudinal axis of a shaft for example, or the centerline of a coiled spring, for example, and that expressions such as "connected" and "connectable", or "mounted" and "mountable", may be interchangeable, in that the present adjustable covering trim also relates to kits with corresponding components for assembling a resulting fully assembled and fully operational covering trim. In addition, a rotatable handle has an implicit "axis of rotation" or "rotational axis".

Moreover, components of the present adjustable covering trim and/or steps of the installation method(s) described herein could be modified, simplified, altered, omitted and/or interchanged, without departing from the scope of the present disclosure, depending on the particular applications which the present adjustable covering trim is intended for, and the desired end results, as briefly exemplified herein and as also apparent to a person skilled in the art.

In addition, although the preferred embodiments as illustrated in the accompanying drawings comprise various components, and although the preferred embodiments of the present adjustable covering trim and corresponding portion(s)/part(s)/component(s) as shown consist of certain geometrical configurations, as explained and illustrated herein, not all of these components and geometries are essential and thus should not be taken in their restrictive sense, i.e. should not be taken so as to limit the scope of the present disclosure. It is to be understood, as also apparent to a person skilled in the art, that other suitable components and cooperation thereinbetween, as well as other suitable geometrical configurations may be used for the present adjustable covering trim and corresponding portion(s)/part(s)/component(s) according to the present covering trim, as will be briefly explained herein and as can be easily inferred herefrom by a person skilled in the art, without departing from the scope of the present disclosure.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

The present disclosure describes an improved adjustable covering trim which is adapted to accommodate different valve installations (i.e., depth of the valve behind the covering surface, distance between the extending cartridge(s) end(s) and the finishing wall, the perpendicularity between the extending cartridges(s) centerline(s) and the finishing wall, etc.) The present disclosure also describes a cartridge adaptor operatively connectable to the cartridge and handle to provide play between the cartridge and handle connection, so as to compensate for any misalignment between the cartridge centerline and the rotational axis of the handle, which may happen when the finishing wall is uneven. The covering trim may also be adapted to provide temperature control directly on the handle. The covering trim is also shaped and configured to allow easy access to the concealed valve for maintenance for example.

Referring now to the figures and more particularly to FIG. 1, there is shown a conventional thermostatic valve 12 (or valve 12) comprising a conventional extending thermostatic cartridge 16 and a extending diverter cartridge 20. The extending thermostatic cartridge 16 defines a thermostatic cartridge distal end 18 with a thermostatic cartridge centerline 19 therealong, whereas the diverter cartridge 20 defines a diverter cartridge distal end 22 with a diverter cartridge centerline 23 therealong. According to FIG. 1, the thermostatic controller 201, which includes extending thermostatic cartridge 16, and the diverter controller 203, which includes extending diverter cartridge 20, are provided as a single-component thermostatic valve 12. The thermostatic valve 12 further includes a hot-water inlet 200, a hot water check valve 202, a cold-water inlet 204, and a cold water check valve 206 for providing hot and cold water flows to thermostatic controller 201, as well as a first outlet 208, a second (optional) outlet 210 and a third (optional) outlet 212 for providing a water flow (or water flows) with the desired temperature to the bathtub tap(s) and/or shower tap(s).

FIG. 2 also illustrates a conventional thermostatic valve 12 (or valve 12), that is, however, provided with a different configuration, where the thermostatic controller 201 and the diverter controller 203 are provided as a two-component valve.

Figure 3:
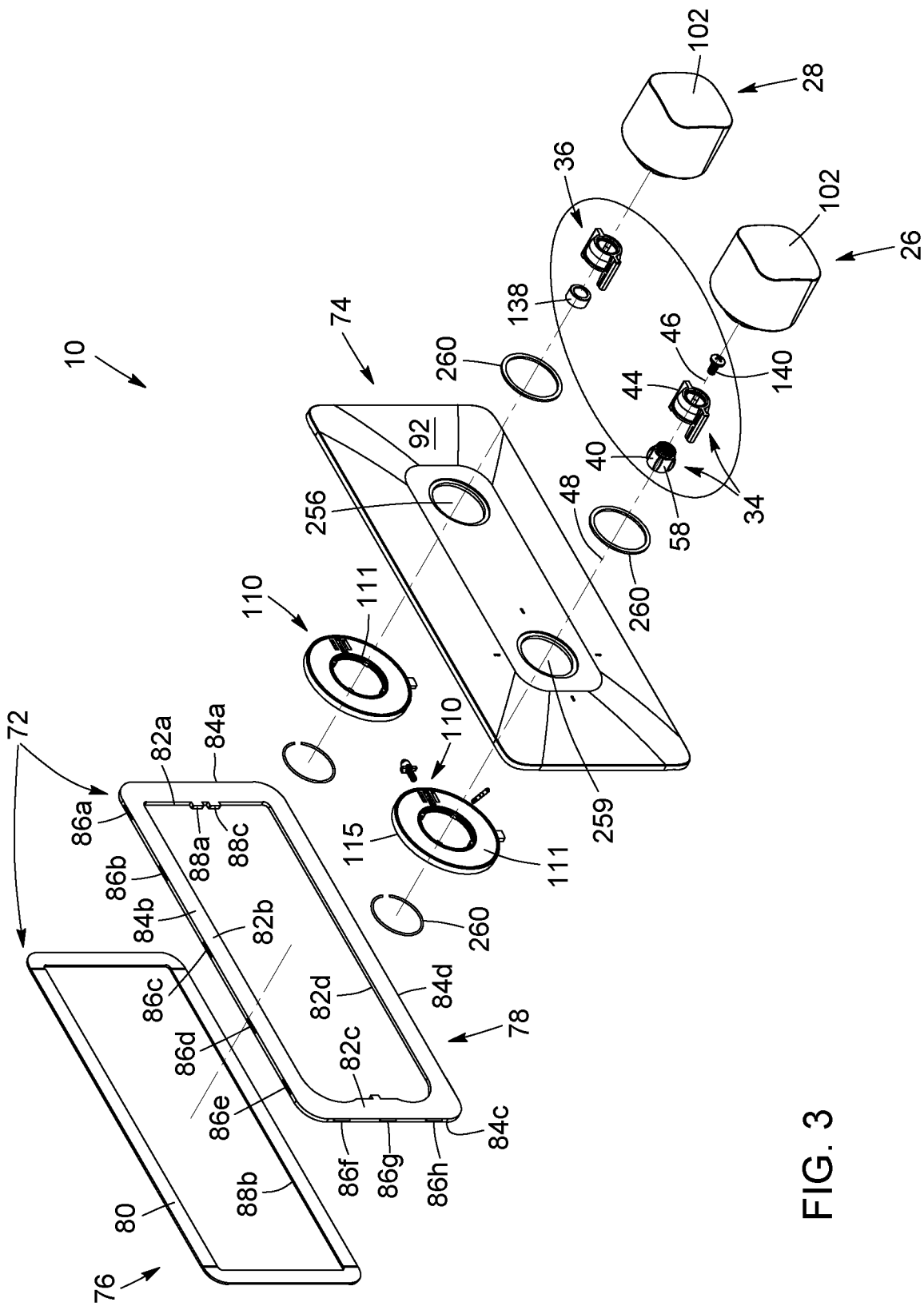
FIG. 3 is an exploded perspective view of a covering trim which is configured for covering the thermostatic valve of FIG. 1 or FIG. 2, in accordance with a possible embodiment.
Figure 3A:
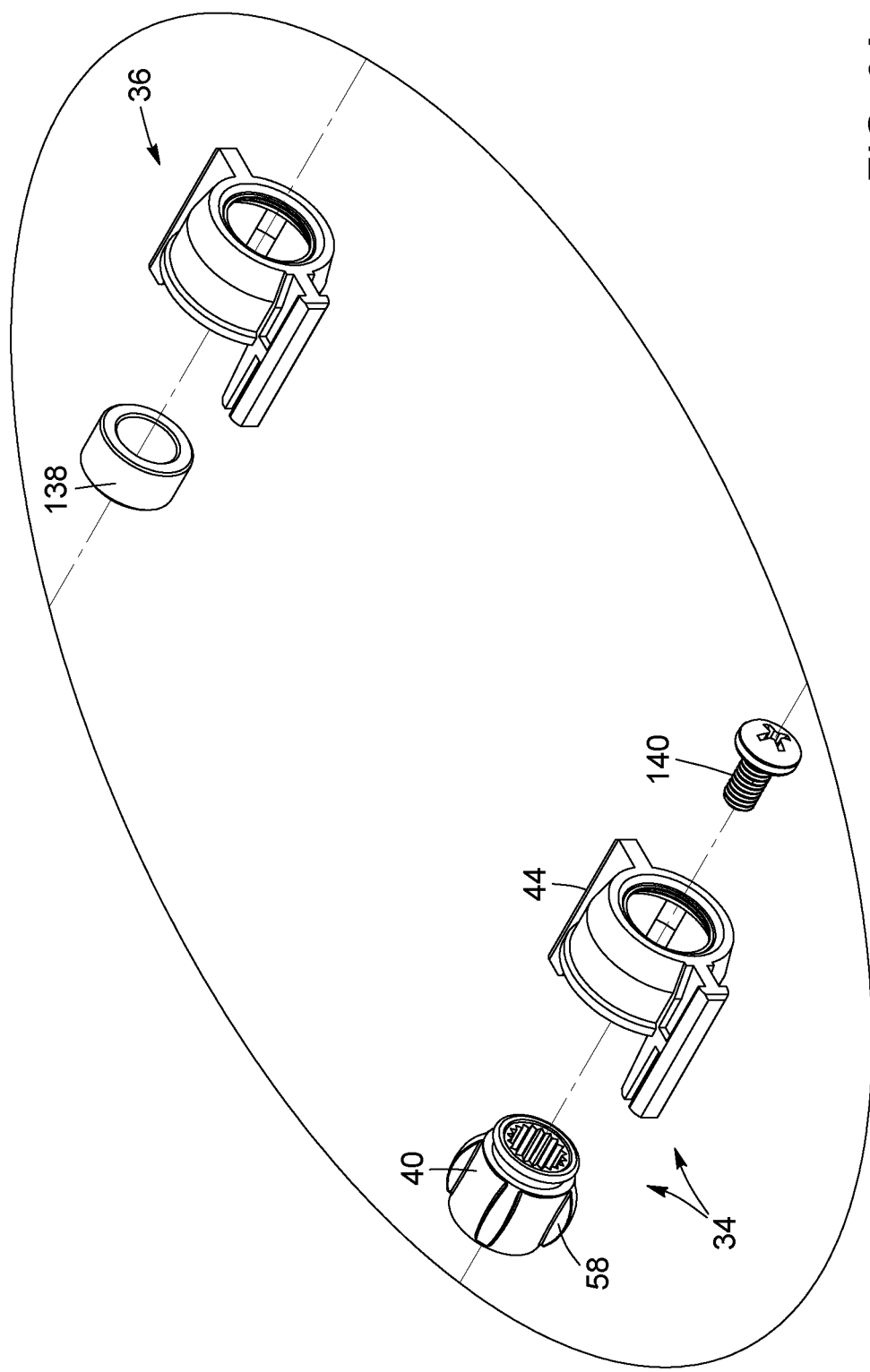
FIG. 3A is an enlarged view of the encircled portion shown in FIG. 3.
Figure 5:
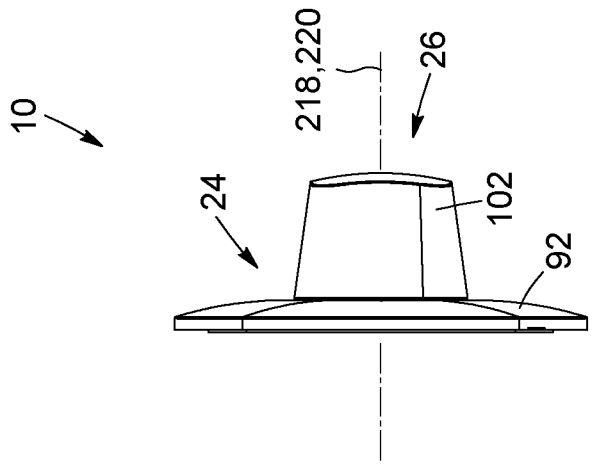
FIG. 5 is a side elevation view of the covering trim shown in FIG. 4.
Figure 4:
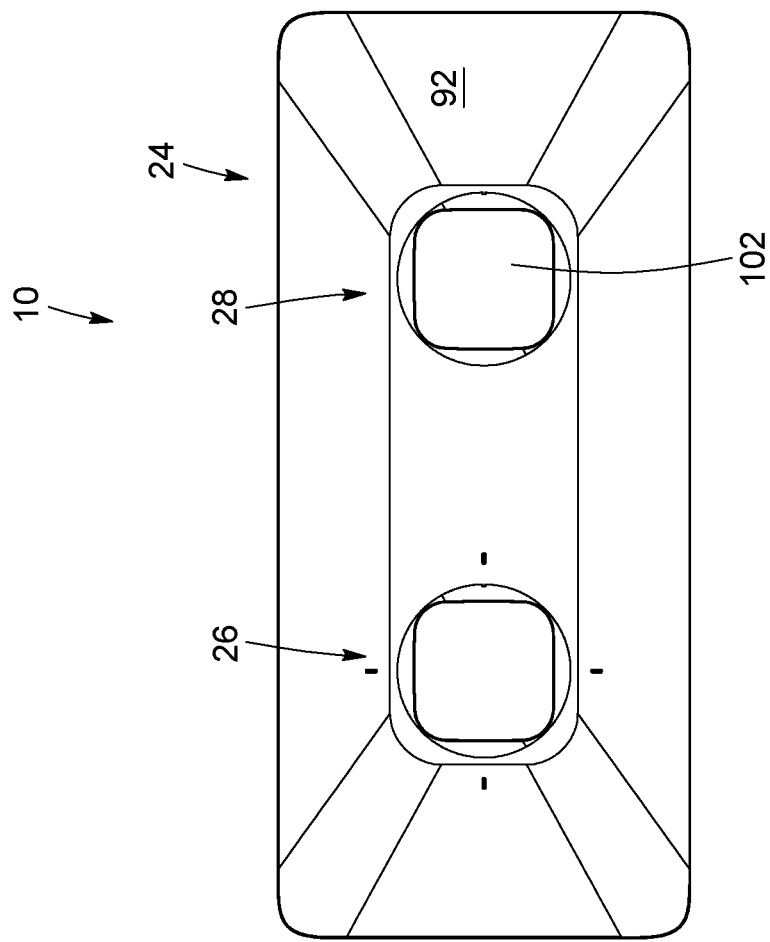
FIG. 4 is a front elevation view of the covering trim shown in FIG. 3, once assembled.

Referring now more particularly to FIG. 3, there is shown an adjustable covering trim 10 which is configured to cover a thermostatic valve 12 which is concealed behind a finishing wall 14 (FIG. 13), as described in more detail below. The adjustable covering trim 10 is sized and configured to cover a one-piece thermostatic valve 12 such as the one illustrated in FIG. 1, or alternatively, to cover a two-piece thermostatic valve 12 such as the one illustrated in FIG. 2. A person skilled in the art would also understand that covering trim 10 can be used in accordance with any concealed valve being provided with an extending thermostatic cartridge (similar to cartridge 16 for example), with an extending diverter cartridge (similar to cartridge 20 for example), or both. Trim 10 can be used to cover, and releasably connect with, any valve (using a rotative activation) that is provided with one or more extending cartridge(s) that extend(s) away from a finishing surface (similar to finishing surface 14 for example).

Now referring to FIGS. 3 to 8B, there is shown that trim 10 comprises a decorative outer frame 24 which is configured to be securely mounted on finishing wall 14. Decorative outer frame 24 is also shaped, sized and configured to cover thermostatic valve 12 and defines decorative outer frame apertures 25a, 25b. Trim 10 further comprises a first handle 26, which is preferably hollow, rotatably coupled to decorative outer frame 24 at aperture 25a and rotatable about an axis of rotation 220. The handle 26 is configured to receive thermostatic cartridge distal end 18 therein. Trim 10 further comprises a second hollow handle 28 rotatably coupled to decorative outer frame 24 at aperture 25b and rotatable about an axis of rotation 218, and configured to receive diverter cartridge distal end 22 therein. Each one of the first and second hollow handles 26, 28 defines a respective handle internal surface 30, 32 (FIG. 8A). Gaskets 260 can be used. Still referring to FIGS. 3 to 8B, there is shown that trim 10 further includes an articulated thermostatic cartridge adaptor 34. The articulated cartridge adaptor 34 is shaped and configured to allow, when in use, for the handle to rotate the extending cartridge of the valve even if the axis of rotation of the handle is at angle with the cartridge centerline. The articulated cartridge adaptor 34 can be adapted to be releasably coupled with handle internal surface 30 of first handle 26. In the embodiment shown, the adaptor 34 is connectable to the handle 26 via a first adaptor portion, which in this embodiment corresponds to an outer portion shaped as an external hollow member 44 (best shown in FIG. 6). Articulated thermostatic cartridge adaptor 34 is also adapted to be mounted on extending thermostatic cartridge 16 at thermostatic cartridge distal end 18 via a second adaptor portion, which in this embodiment corresponds to an outer portion shaped as an internal hollow member 40. Both the thermostatic cartridge distal end 18 and the articulated thermostatic cartridge adaptor 34 can rotate with first handle 26 upon rotation of the handle 26 about thermostatic cartridge centerline 19, even though the axis of rotation of the first hollow handle 220 is at angle with the thermostatic cartridge centerline 19. The first and the second adaptor portions are movable one relative to the other to compensate for any misalignment between the axis of rotation of the handle 220 and the cartridge centerline 19, which can occur when the finishing wall is not perfectly perpendicular to the cartridge centerline. Articulated thermostatic cartridge adaptor 34 is thus articulable relatively to thermostatic cartridge centerline 19, as described in more detail below.

Figure 13:
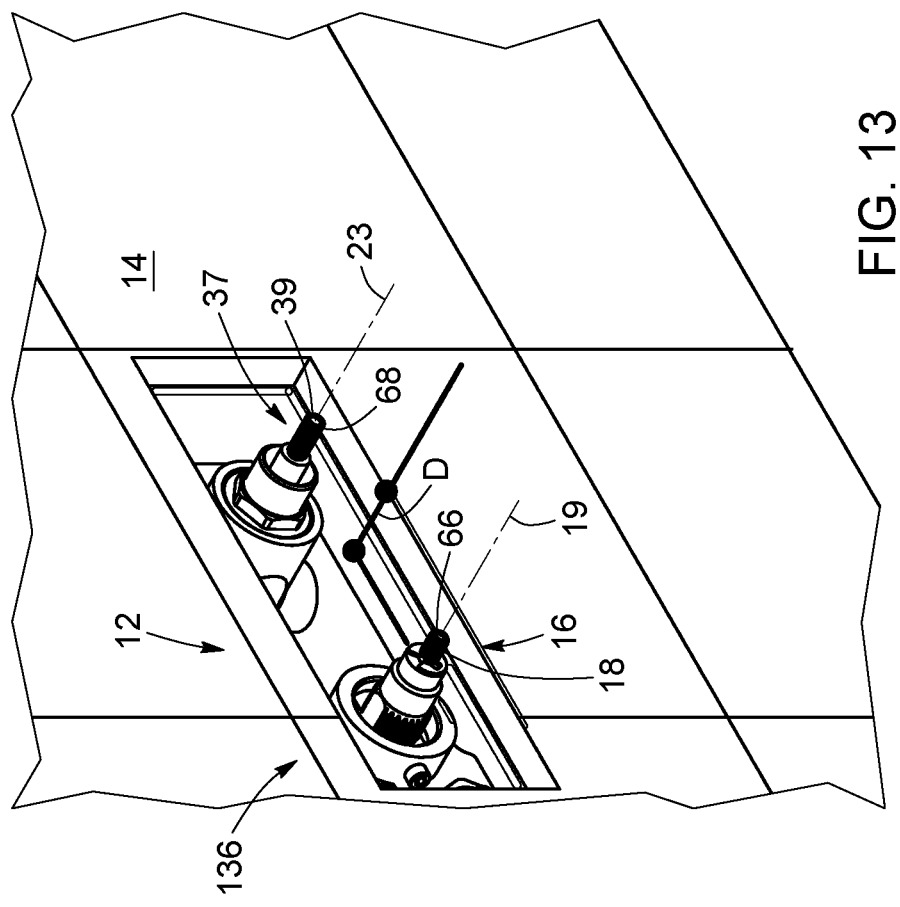

In the non-limitative embodiment shown in FIGS. 13 and 15, trim 10 further may comprise a diverter cartridge extension 37 which is adapted to be releasably coupled to extending diverter cartridge 20. Diverter cartridge extension 37 can define the diverter cartridge extension distal end 39. In another non-limitative embodiment (not shown), trim 10 can be provided without a diverter cartridge extension 37. Trim 10 further may also comprise an articulated diverter cartridge adaptor 36 (having a construction similar to adaptor 34) which is configured to be releasably coupled with handle internal surface 32 of second hollow handle 28 through a first adaptor portion 44. Articulated diverter cartridge adaptor 36 is also adapted to be mounted on diverter cartridge extension 37 at diverter cartridge extension distal end 39 through a second adaptor portion 40 such that diverter cartridge distal end 22, diverter cartridge extension distal end 39 and articulated diverter cartridge adaptor 36 can rotate with second hollow handle 28 upon rotation of second hollow handle 28 about diverter cartridge centerline 23, even though the axis of rotation of the second hollow handle 218 is at angle with the diverter cartridge centerline 23. The articulated diverter cartridge adaptor 36 (having a construction similar to adaptor 34) can also adapted to be directly mounted on the diverter cartridge distal end 22 through a second adaptor portion 40, without the need for incorporating a diverter cartridge extension therebetween. In addition, the first and the second adaptor portions are movable one relative to the other to compensate for any misalignment between the axis of rotation of the handle 218 and the cartridge centerline 23. Articulated diverter cartridge adaptor 36 is thus articulable relatively to diverter cartridge centerline 23, as described in more detail below.

In possible configurations of the articulated adaptor, the first adaptor portion 44 can be an outer portion, and the second adaptor 40 portion can be an inner portion received in the outer portion and be movable relative thereto at least along the cartridge centerline 19,23 and also preferably along three degrees of freedom (in X, and Z directions), so as to compensate for misalignment along any direction. The handle and the outer portion of the articulated cartridge adaptor may comprise complementary connecting portions to secure the articulated cartridge adaptor to the handle, while the inner portion and the outer portion of the articulated cartridge adaptor comprise complementary connecting components to connect the inner and outer portions with one another, and to allow for the movement of the inner portion relative to the outer portion.

In the non-limitative embodiment shown in FIGS. 3, 3A, 6 and 7, each one of the articulated thermostatic and diverter cartridge adaptors 34, 36 defines a passage 38 for respectively receiving thermostatic cartridge distal end and diverter cartridge distal end therein. The distal ends of the valve's cartridges can be provided with extensions or not, depending on the installation conditions. Moreover, each one of the articulated thermostatic and diverter cartridge adaptors 34, 36 comprises an internal hollow member 40 which defines an internal hollow member centerline 48 and an internal hollow member passage 42 (corresponding to passage 38) for receiving thermostatic and diverter cartridge distal ends 18 and, 22 (or diverter cartridge extension distal end 39) therein, as well as an external hollow member 44, which defines an external hollow member centerline 46.

Internal hollow member 40 is being securely received within external hollow member 44. As described in more detail below, once trim 10 is installed, external hollow member 44 is movable relatively to internal hollow member 40. Indeed, external hollow member 44 defines an external hollow member centerline 46, while internal hollow member 40 defines an internal hollow member centerline 48. External hollow member 44 is movable relatively to internal hollow member 40 such that an angle can be provided between external hollow member centerline 46 and internal hollow member centerline 48 (FIGS. 6A and 6B). In the non-limitative embodiment shown, external hollow member 44 defines an external hollow member outer surface 52 and comprises two spaced apart external member protrusions 54a, 54b which outwardly extend from external hollow member outer surface 52.

In the non-limitative embodiment shown, each one of the handle internal surfaces 30, 32 (FIG. 8A) defines two spaced apart corresponding handle longitudinal grooves 56a, 56b which are shaped, sized and configured so as to slidably receive the external member protrusions 54a, 54b therein. Internal hollow member 40 defines an internal hollow member outer surface 58 (FIGS. 6 and 7) and comprises four spaced apart internal member protrusions 60a, 60b, 60c, 60d. Each one of the internal member protrusions 60a, 60b, 60c, 60d outwardly extends from internal hollow member outer surface 58. The grooves of the handle 26 and member protrusions of the adaptor 34 are one possible configuration of complementary connecting portions, but other configurations are possible. For example, the grooves could be provided on the adaptor, and the protrusions could be provided in the handle.

Figure 6:
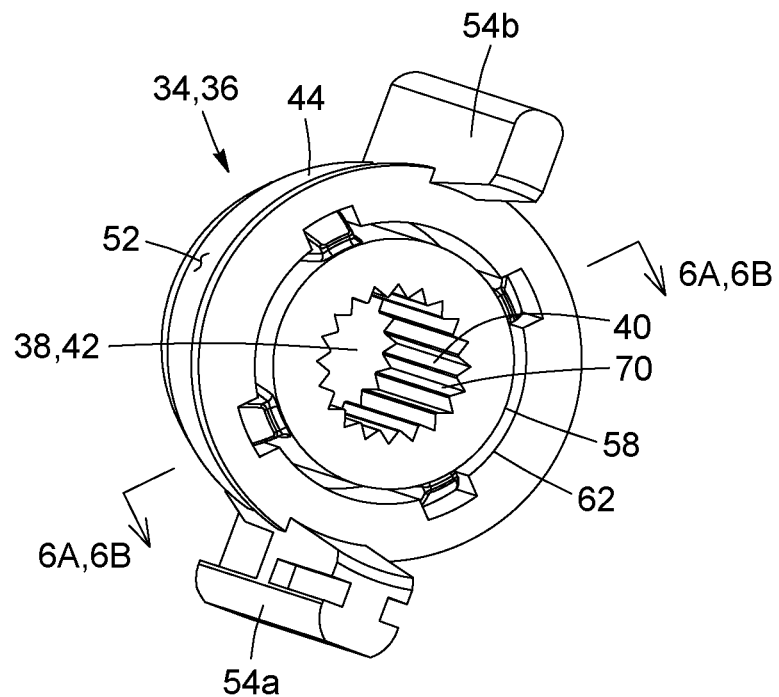
FIG. 6 is a first perspective view of one of the articulated cartridge adaptors shown in FIG. 3A.
Figure 7:
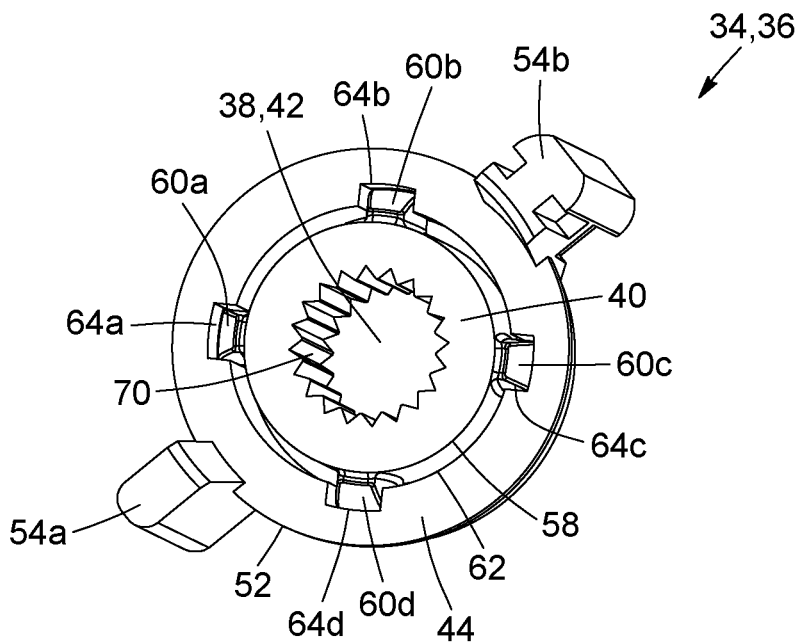
FIG. 7 is a second perspective view of the articulated cartridge adaptor shown in FIG. 6.
Figure 6A:
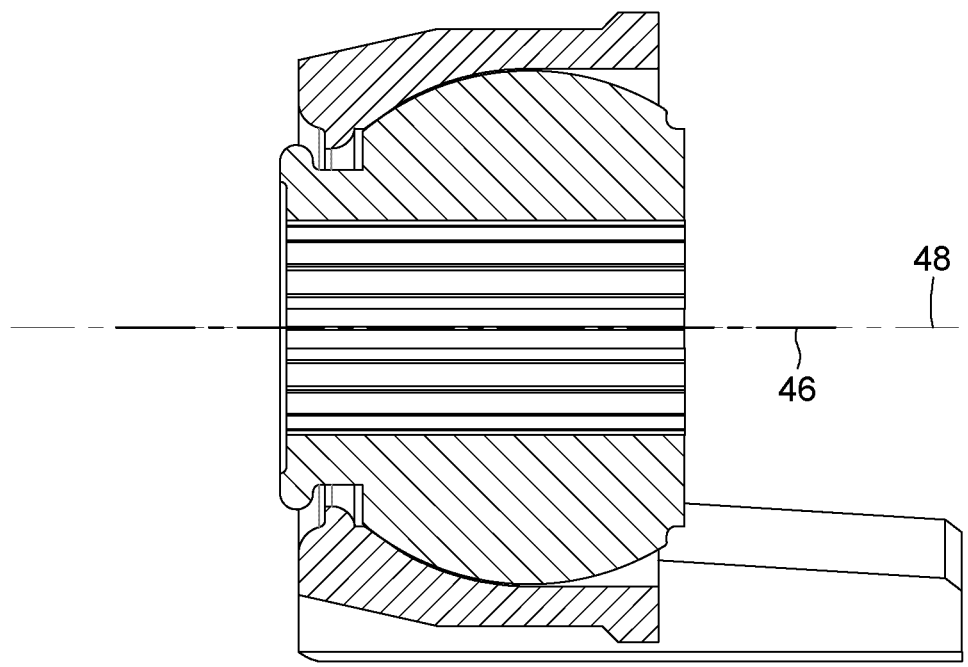
FIGS. 6A and 6B are sectional views taken along cross-section lines 6A-6A and 6B-6B of the articulated cartridge adaptor shown in FIG. 6.
Figure 6B:
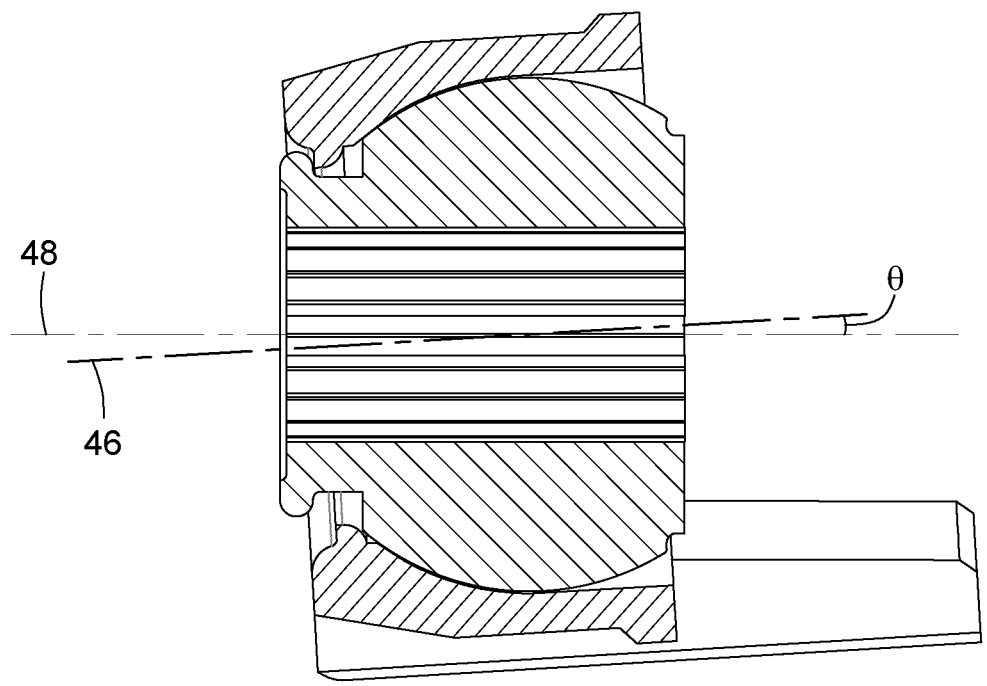
Figure 8A:
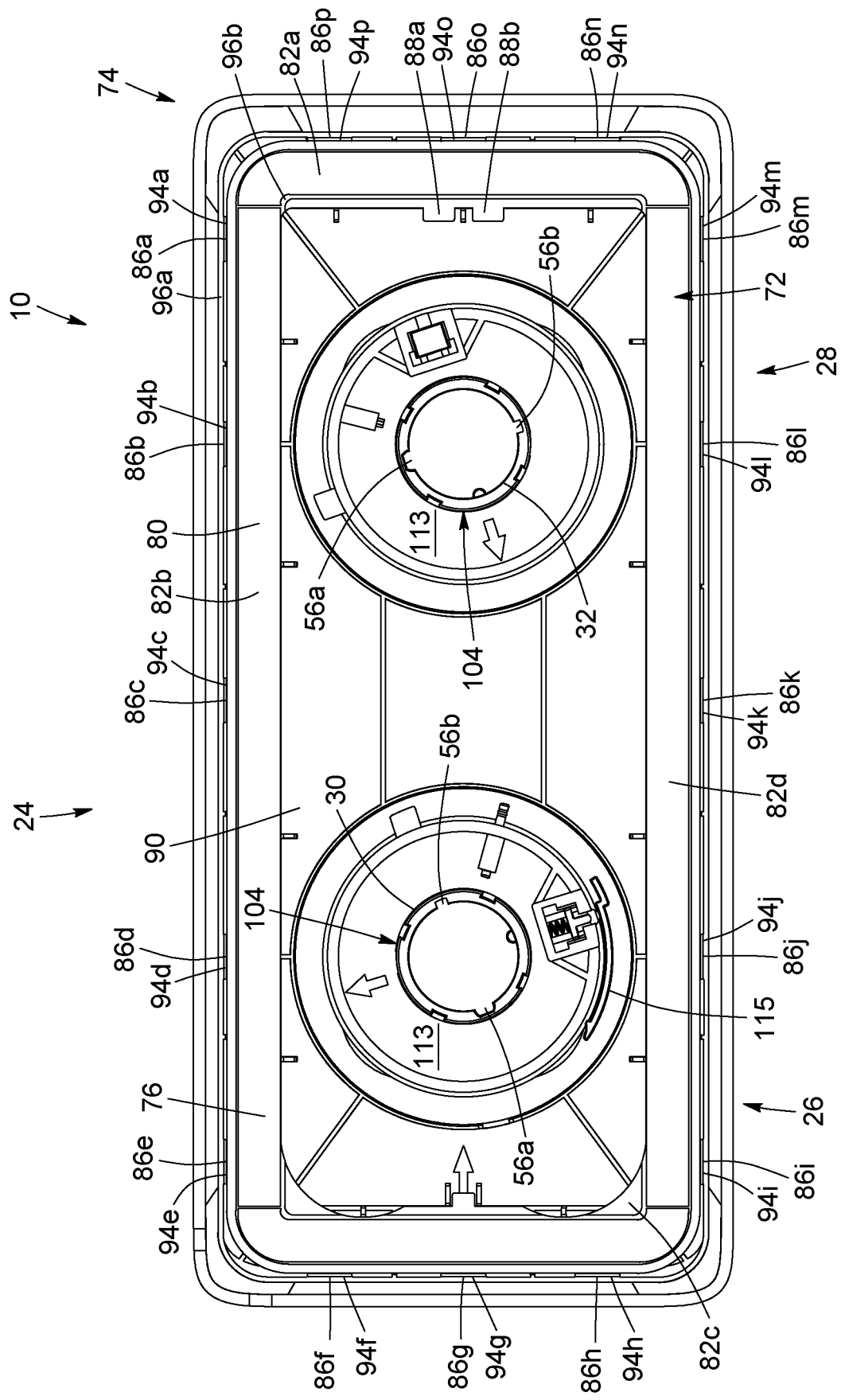
FIG. 8A is a rear view of the covering trim shown in FIG. 3, once assembled.
Figure 8B:
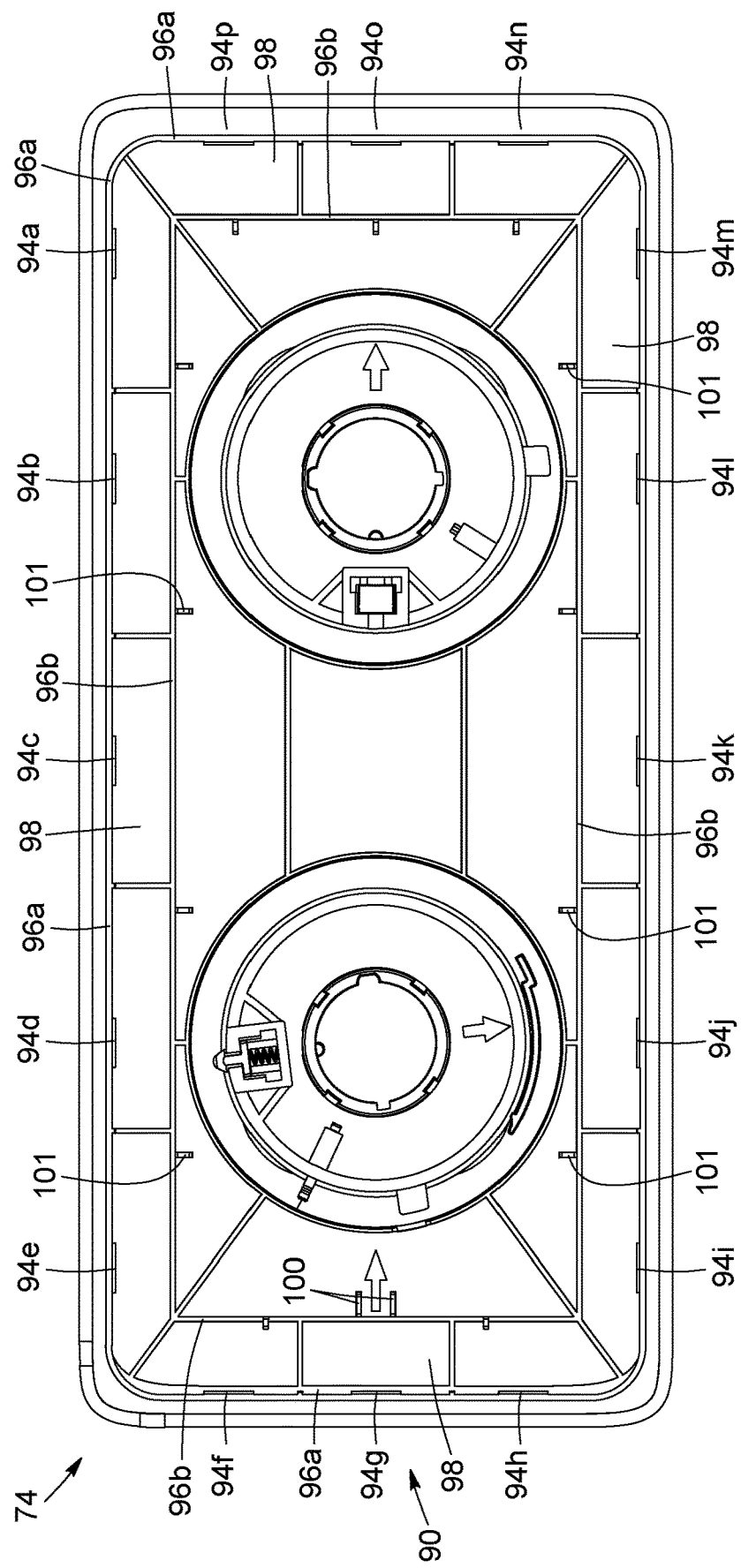
FIG. 8B is a rear view of a decorative cover of the covering trim shown in FIG. 8A.
Figure 9:
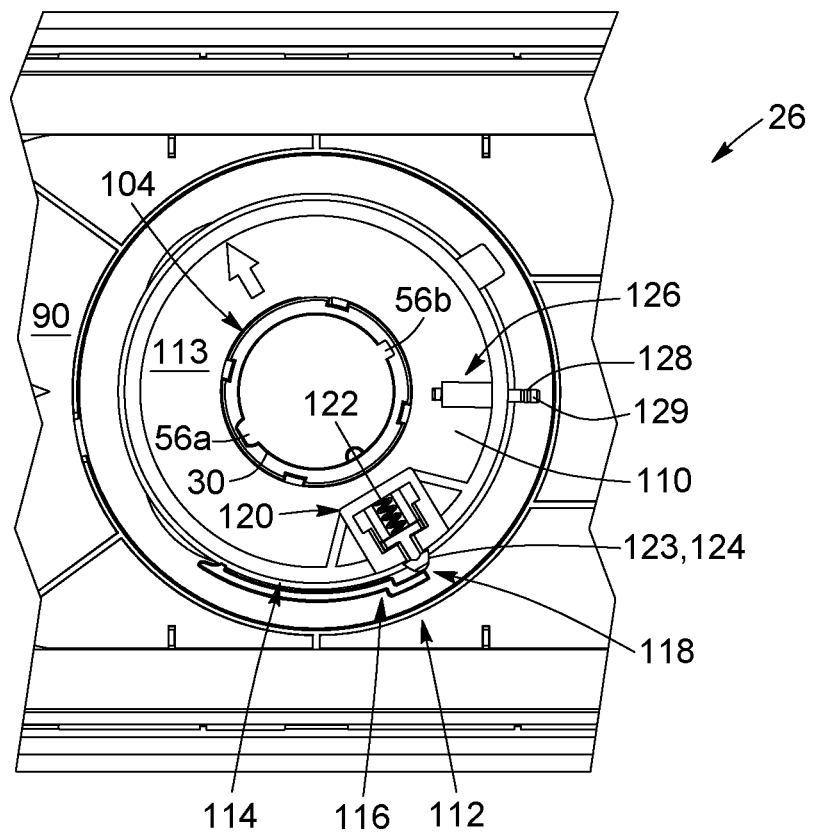
FIG. 9 is a close-up view of the temperature control mechanism provided on one of the handles, where the mechanism is set to provide a first water temperature.

Referring now to FIGS. 6 and 7, the external hollow member 44 further defines an external hollow member inner surface 62. External hollow member inner surface 62 defines four corresponding longitudinal grooves 64a, 64b, 64c, 64d. Each one of the longitudinal grooves 64a, 64b, 64c, 64d is shaped, sized, and configured so as to movably receive therein the corresponding internal member protrusions 60a, 60b, 60c, 60d. Again here, the grooves of the outer portion/external hollow member 44 and the member protrusions of the inner portion/inner hollow member 40 are one possible configuration of complementary connecting components, but other configurations are possible. For example, the grooves could be provided on the inner portion of the adaptor, and the protrusions could be provided in the outer portion of the adapter.

As best shown in FIGS. 1 and 3, extending thermostatic cartridge 16 defines a cartridge outer surface 66 at thermostatic cartridge distal end 18, whereas in the non-limitative embodiment shown in FIGS. 13 and 15, diverter cartridge extension 37 defines an extension outer surface 68 at diverter cartridge extension distal end 39. Internal hollow member 40 defines an internal hollow member inner surface 70 (FIG. 6). Internal hollow member inner surface 70 corresponds to both thermostatic cartridge outer surface 66 and extension outer surface 68 such that, in operation, both extending cartridges 16, 18 can respectively rotate with respective articulated cartridge adaptors 34, 36 upon rotation of respective hollow handles 26, 28 about cartridge centerlines 19, 23. In another non-limitative embodiment (not shown), internal hollow member inner surface 70 corresponds to both thermostatic cartridge outer surface 66 and diverter cartridge outer surface such that, in operation, both extending cartridges 16, 18 can respectively rotate with respective articulated cartridge adaptors 34, 36 upon rotation of respective hollow handles 26, 28 about cartridge centerlines 19, 23.

Now referring more particularly to FIGS. 3 to 5 and 8A and 8B, there is shown that decorative outer frame 24 comprises a mounting frame 72 which is configured to be securely mounted on finishing wall 14 as well as a decorative cover 74 which can be releasably mounted on mounting frame 72. As illustrated, mounting frame 72 defines a perimeter which is shaped, sized, and configured so as to encircle thermostatic valve 12. Mounting frame 72 defines a mounting surface 76 and a cover receiving surface 78 which is found opposite mounting surface 76. Mounting frame 72 comprises an adhesive material 80 which is pre-affixed to mounting surface 76 to allow adhesion between mounting frame 72 and finishing wall 14. Mounting frame 72 further defines internal side walls 82a, 82b, 82c, 82d and external side walls 84a, 84b, 84c, 84d which join mounting surface 76 and cover receiving surface 78 together (FIG. 3). Mounting frame 72 further comprises tabs 86a to 86p (FIG. 8A) which each extends from one of the external side walls 84a, 84b, 84c, 84d. Mounting frame 72 also comprises tabs 88a, 88b, 88c which each extends from one of the internal side walls 82a, 82b, 82c, 82d. The mounting frame and the decorative cover thus comprise complementary tabs for securing the mounting frame and the decorative cover together.

Still referring to FIGS. 3 to 5 and 8A and 8B, decorative cover 74 defines a mounting frame receiving surface 90 and a decorative surface 92 which is found opposite mounting frame receiving surface 90. Decorative cover 74 comprises a plurality of upwardly extending external and internal walls 96a, 96b which extend from mounting frame receiving surface 90 and which together define an open-top channel 98 which is shaped, sized and configured so as to releasably receive mounting frame 72 therein (mounting frame 72 can be clipped with decorative cover 74 so as to be secured within open-top channel 98). Indeed, decorative cover 74 further comprises a plurality of corresponding tabs 94a to 94p, where each tab extends from one of the upwardly extending external walls 96a which extend from mounting frame receiving surface 90. Each one of the tabs 94a to 94p is configured so as to interact with a corresponding one of the tabs 86a to 86p which are extending from external side walls 84a, 84b, 84c, 84d of mounting frame 72, thereby allowing securing mounting frame 72 and decorative cover 74 together. Additional tabs 100, 101, which extend from mounting frame receiving surface 90 about upwardly extending walls 96b are also provided to maintain mounting frame 72 in open-top channel 98 of decorative cover 74.

Still referring to FIGS. 3 to 5 and 8A and 8B, there is shown that each one of first and second hollow handles 26, 28 comprises a hollow handle decorative cover 102 as well as a sleeve 104 which is sized and configured to be received within hollow handle decorative cover 102. Sleeve 104 defines an outer end 106 and an inner end (not shown) which is found opposite outer end 106. Each one of first and second hollow handles 26, 28 further comprises a ring portion 110 which radially and outwardly extends from outer end 106 of sleeve 104. Ring portion 110 defines a cover interfacing surface 111, a valve interfacing surface 113 as well as a peripheral edge 115 (FIG. 3) which joins cover interfacing surface 111 and valve interfacing surface 113 together. It will be noted that the use of a sleeve is optional: it is preferably used when the handle decorative cover is made of plastic or other polymeric material. For handle covers made of metal, the sleeves may not be necessary. In this case, the handle's connecting portions that are used to interface with the adaptor (such as grooves) can be formed on the internal surface of the handle.

Figure 14:
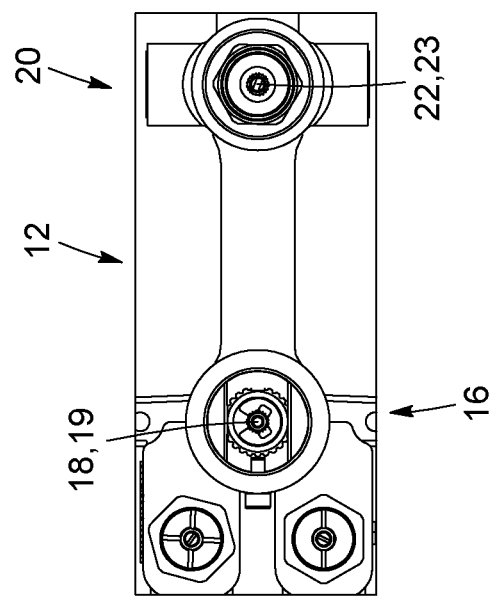
Figure 27:
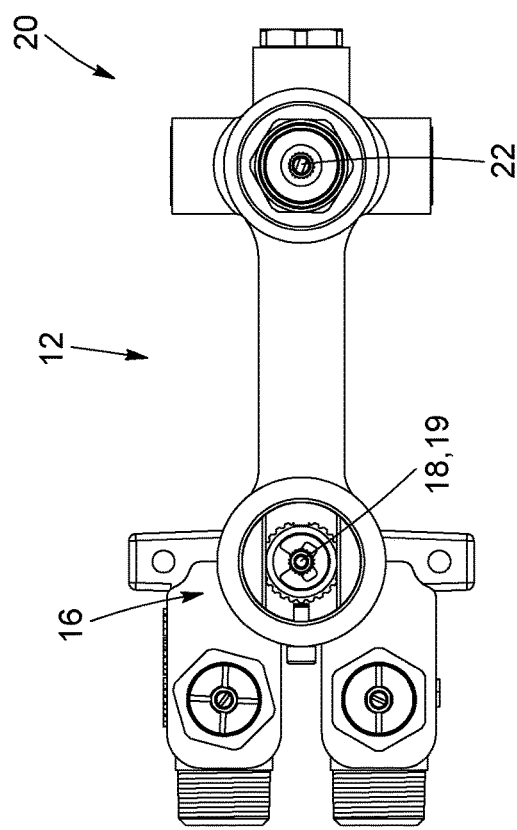
FIGS. 27, 28 and 28A illustrate different installation orientations of the thermostatic valve.
Figure 28A:
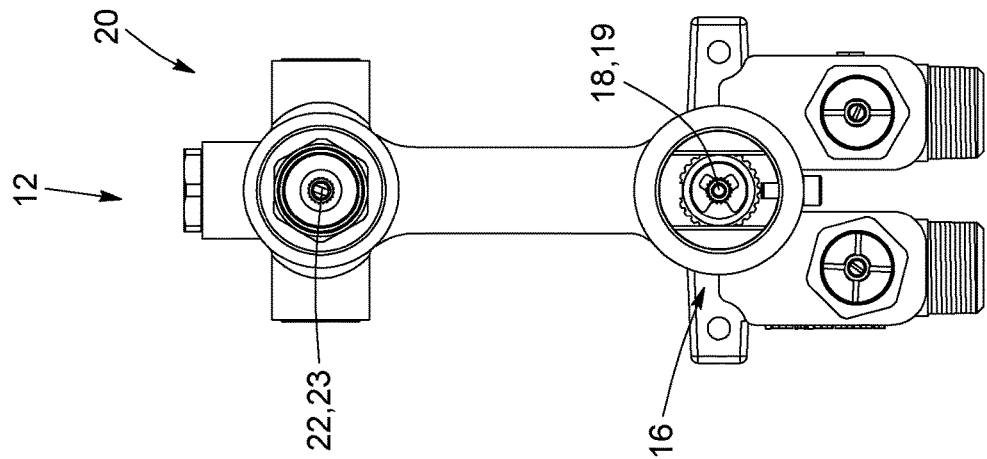
Figure 28:
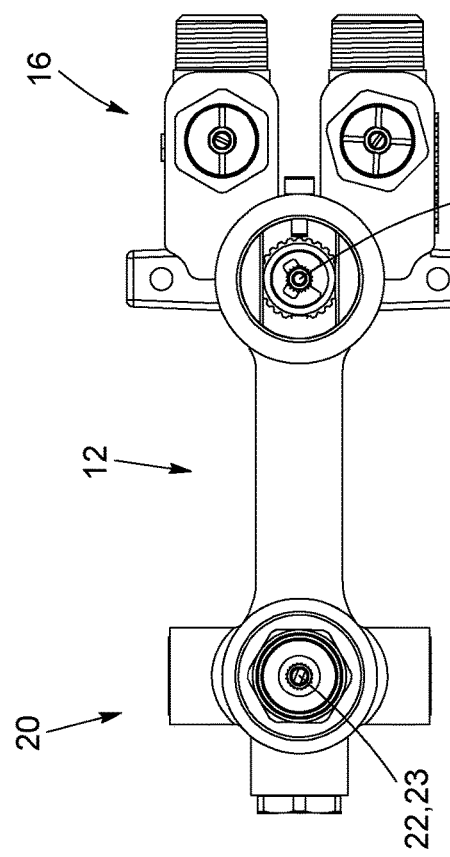
Figure 29B:
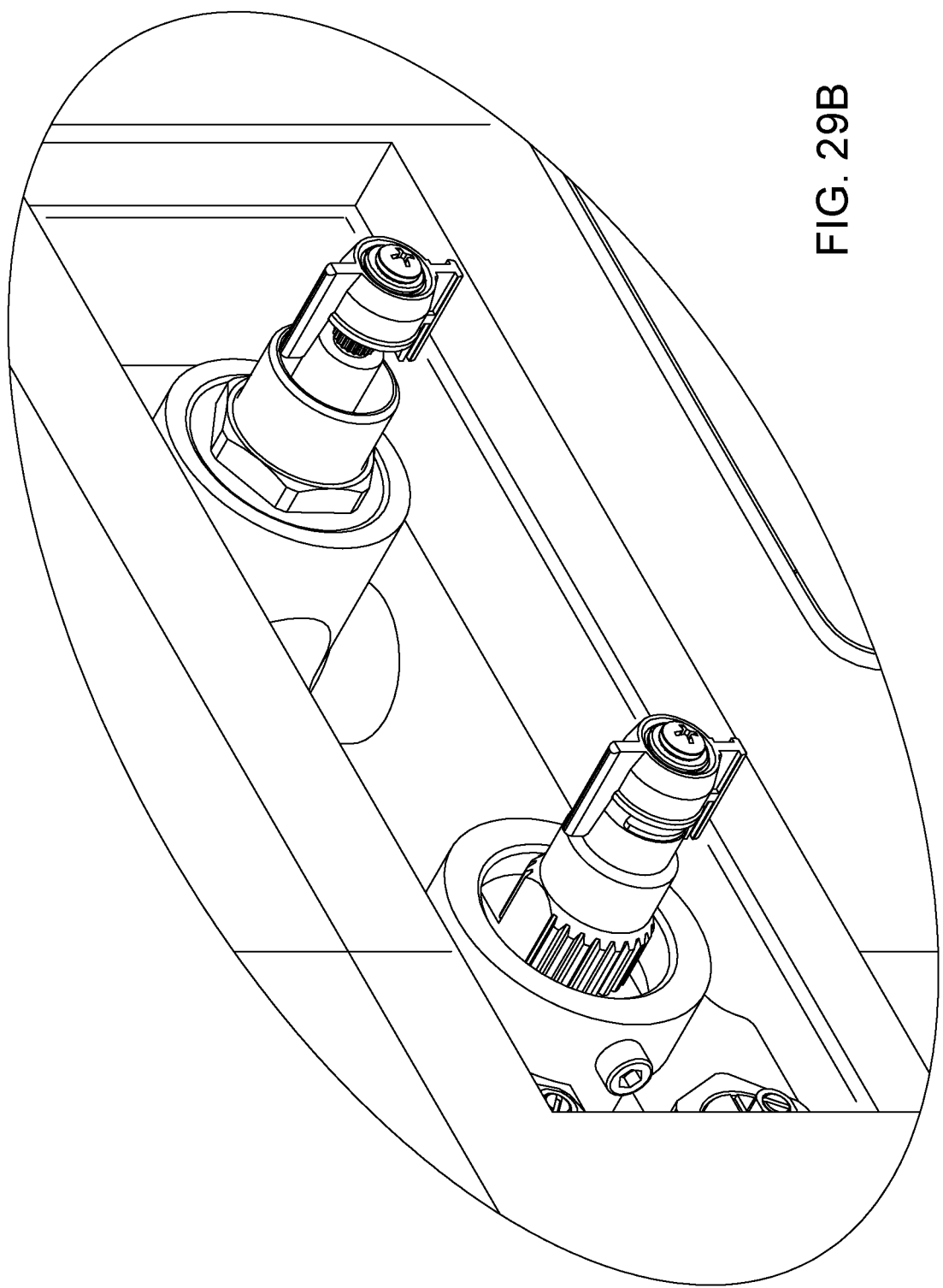
FIG. 29B is an enlarged view of the encircled portion shown in FIG. 29.

Now referring more particularly to FIGS. 3 to 8B and 13 to 26, there is described in more details the method used to install adjustable covering trim 10. In order to cover thermostatic valve 12 once it has been concealed behind a wall that has been finished to provide finishing wall 14, a user first needs to confirm that the distance D between extending thermostatic cartridge 16 and finishing wall 14 is conformed (FIG. 13). Opening 136 (FIG. 13) provided in finishing wall 14 also needs to define dimensions that are conformed. For example, the installer or user can confirm that the height of opening 136 as well as the width of opening 136 are conformed (i.e., that decorative outer frame 24 will completely cover opening 136). The user can further confirm, for example, that the distance between the hot water and cold water inlets 200, 204 and a side of opening 136 is conformed (FIG. 14). It is to be noted that thermostatic valve 12, such as the one illustrated in FIG. 1, can be installed according to different orientations, as illustrated in FIGS. 27, 28 and 28A.

As articulated thermostatic cartridge adaptor and articulated diverter cartridge adaptor 34, 36 need to be provided on thermostatic valve 12 at substantially the same distance from finishing wall 14 (so that decorative outer frame 24 perfectly interfaces with finishing wall 14), a diverter cartridge extension 37 can be provided at diverter cartridge distal end 22, if necessary. Length and configuration of diverter cartridge extension 37 can vary according to the needs of the installation, namely, depending on the diverter that is provided within valve 12 (e.g., 2-way diverter with stop full-flow shared, 2-way diverter with stop outlet A or B, not shared, 3-way diverter with stop full-flow shared, 3-way diverter with stop outlet A or B or C not shared, etc.). Indeed, diverter cartridge extension 37 is configured to receive diverter cartridge distal end 22 therein. When diverter cartridge distal end 22 is coupled to diverter cartridge extension 37, diverter cartridge extension 37 is prevented from rotating relatively to diverter cartridge distal end 22 and both diverter cartridge distal end 22 and diverter cartridge extension 37 are able to rotate jointly and about diverter cartridge centerline 23. In the non-limitative embodiment shown in FIG. 3, an bushing 138 may also inserted at diverter cartridge extension distal end 39 such that thermostatic cartridge distal end 18 of extending thermostatic cartridge 16 and diverter cartridge extension distal end 39 of diverter cartridge extension 37 have the same length (same distance between cartridge end and finishing wall), so that only one configuration of adaptor 34, 36 is necessary.

Articulated thermostatic cartridge adaptor 34 is then provided on extending thermostatic cartridge 16 by providing thermostatic cartridge distal end 18 to be inserted in internal hollow member passage 42 provided in internal hollow member 40 of articulated thermostatic cartridge adaptor 34, while articulated diverter cartridge adaptor 36 is provided on diverter cartridge extension 37 by providing diverter cartridge extension distal end 39 to be inserted in passage 42 provided in internal hollow member 40 of articulated diverter cartridge adaptor 36. It is to be noted that at this stage, internal hollow member 40 has already been introduced within external hollow member 44 (and cannot be released therefrom), for both articulated adaptors 34, 36. It is also to be noted that articulated adaptors 34, 36 are identical (i.e., any one of the two articulated adaptors 34, 36 can be provided on extending thermostatic cartridge 16 and the other one of the two articulated adaptors 34, 36 can be provided on extending diverter cartridge 20 or diverter cartridge extension 37). A first fastener 140 can then be used to secure articulated thermostatic cartridge adaptor 34 on extending thermostatic cartridge 16 (which is provided with a threaded internal surface), while a second fastener (not shown) can be used to secure articulated diverter cartridge adaptor 36 on diverter cartridge extension 37 (which is provided with a threaded internal surface). Since an extension 37 is used on the diverter side, second fastener can be longer than first fastener 140. Both hollow handles 26, 28 can then be aligned (pushed towards finishing wall or pull away from finishing wall) according to the user needs (FIGS. 18 and 18A).

The user or installer can then peel off protective layer covering adhesive material 80 so that decorative outer frame 24 and handles 26, 28 mounted thereon can be secured to finishing wall 14. Indeed, instead of screwing a trim-plate on the rough as is the norm (trim-plate being rigidly coupled to the rough), when it is time to glue the trim in place (to secure the decorative outer frame 24 on finishing wall 14), as it is brought near finishing wall 14, decorative outer frame 24 is guided by articulated cartridge adaptors 34, 36 which are already mounted on valve-cartridges 16, 20 and thus, always ends-up at the correct intersection between the decorative-handle centerline and the valve-mechanism centerline.

Alternatively, mounting frame 72 can be secured to finishing wall 14 as a first step. Once both articulated thermostatic cartridge adaptor 34 and articulated diverter cartridge adaptor 36 are installed, decorative cover 74 which rotatably receives first and second hollow handles 26, 28 can be connected thereon.

On the side of thermostatic controller 201, external member projections or protrusions 54a, 54b extending from external hollow member 44 of articulated thermostatic cartridge adaptor 34 will need to be aligned with corresponding handle longitudinal grooves 56a, 56b of handle internal surface 30 of first hollow handle 26. On the other hand, on the side of diverter controller 203, external member projections or protrusions 54a, 54b extending from external hollow member 44 of articulated diverter cartridge adaptor 36 will need to be aligned with corresponding handle longitudinal grooves 56a, 56b of handle internal surface 32 of second hollow handle 28. Since length of longitudinal grooves 56a, 56b is longer than length of projections or protrusions 54a, 54b, projections or protrusions 54a, 54b can be vertically adjusted and positioned within handles 26, 28 so that decorative outer frame 24 can perfectly interface with finishing wall 14. Furthermore, since external hollow member 44 of articulated thermostatic cartridge adaptor 34 is articulable relatively to its corresponding internal hollow member 40 and since external hollow member 44 of articulated diverter cartridge adaptor 36 is also articulable relatively to its corresponding internal hollow member 40, decorative outer frame 24 can be mounted on finishing surface 14 so as to be perfectly flushed, even when finishing wall 14 is not perfectly perpendicular with respect to extending cartridges 16, 20. Indeed, each one of the articulated adaptors 34, 36 provides an articulated interface between cartridge distal ends 18, 22 (or extension distal end 39) and their corresponding handle internal surfaces 30, 32, thanks to the angle that can be provided between external hollow member centerline 46 and its corresponding internal hollow member centerline 48, the latter corresponding to cartridge centerlines 19, 23 once the articulated adaptors 34, 36 are mounted on cartridge distal end 18 and extension distal end 39 respectively.

Depth adjustment of decorative outer frame 24 is therefore provided within first and second hollow handles 26, 28 (no need to install the trim using additional sleeves anymore). The articulation interface provided by adaptors 34, 36 also allows to perfectly fit trim 10 to finishing surface 14, even in a scenario where the extending cartridges 20, 22 are not perfectly perpendicularly oriented relatively to finishing surface or wall 14.

It is also to be mentioned that the articulated cartridge adaptors (34 or 36), as well as the sleeves 104 and the ring portions 110 can be made of a polymeric material that is capable of withstanding mechanical stresses provided during operation of trim 10 or of any other suitable material.

The covering trim 10 for shower and/or bathtub concealed valves described above is therefore not only easy to install but also allows for greater freedom in providing a shower and/or a bathtub with a desired appearance than heretofore known.

Figure 33:
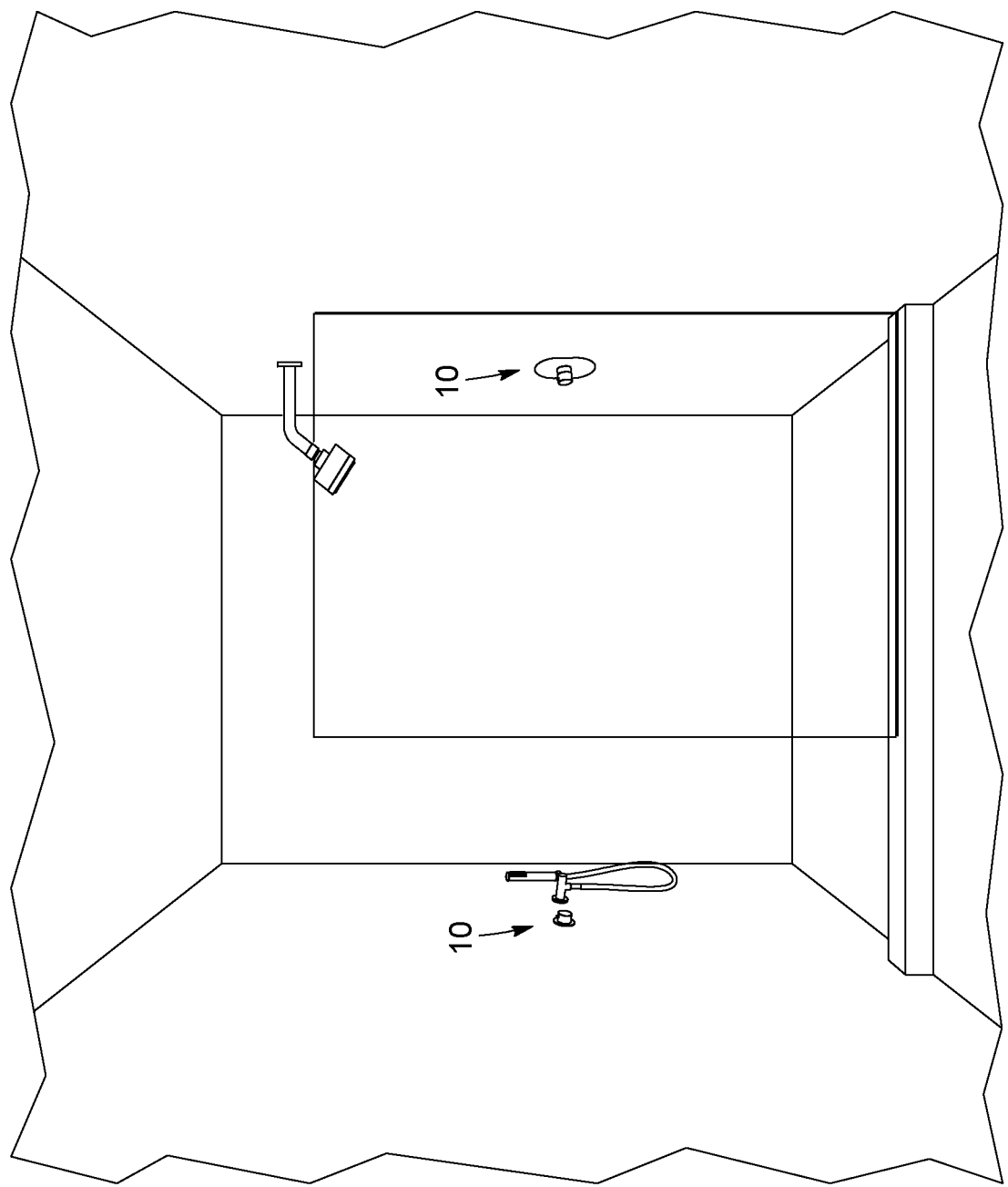
FIGS. 33 and 34 illustrate covering trims in accordance with other embodiments.
Figure 34:
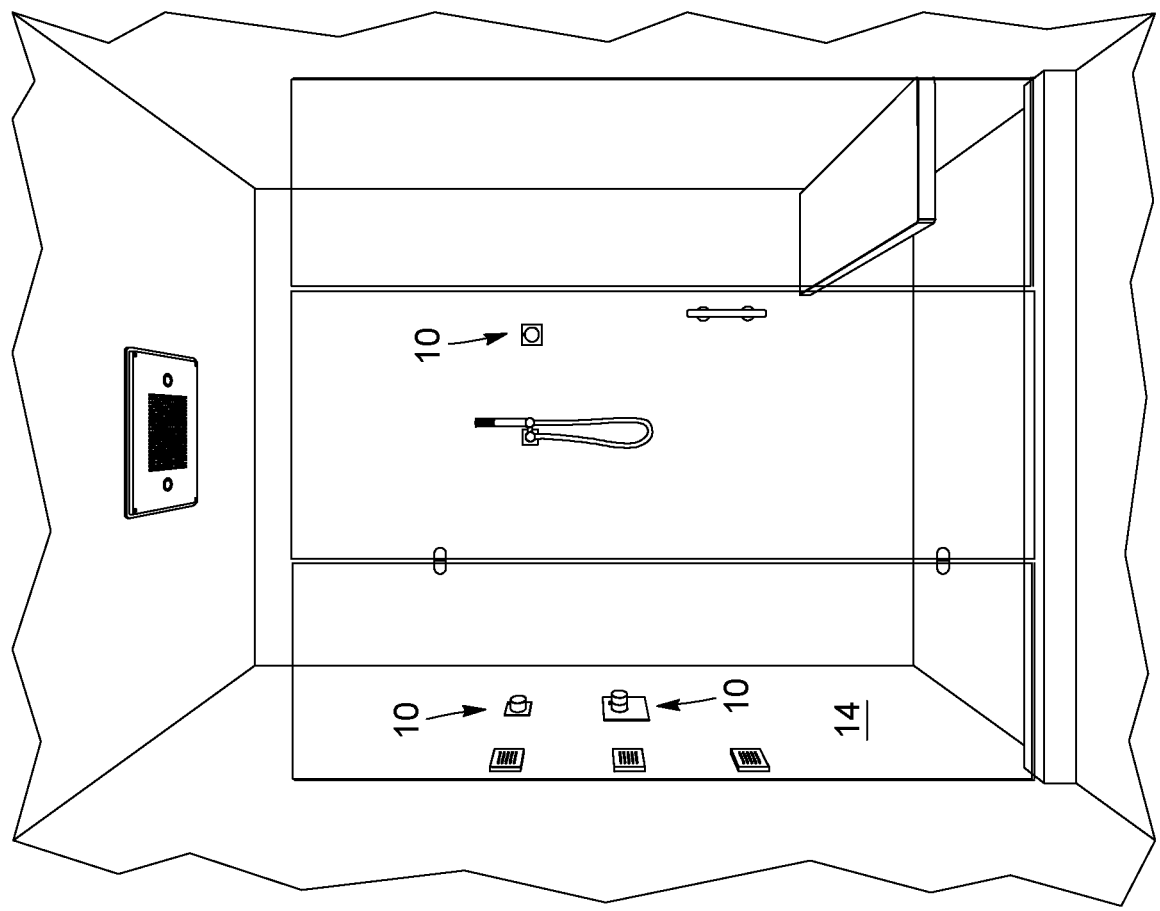

It is important to be mentioned that a person skilled in the art to which trim 10 pertains would also understand that a valve of any configuration (as long as it involves a rotative activation) can be covered using the trim described above. Indeed, instead of comprising two hollow handles rotatably mounted on a decorative outer frame, a trim can include only one handle to accommodate a scenario where the valve only includes one extending cartridge (FIGS. 33 and 34). Each one of the hollow handles can further take any size, shape and/or configuration, as long as an articulable interface is provided between the extending cartridge of the valve (passed finishing surface or wall 14) and the handle internal surface.

It is also to be mentioned that a person skilled in the art to which trim 10 pertains would understand that the handle internal surface, the cartridge adaptor (and its external and internal hollow member) can take any shape, size and/or configurations, as long as it provides 1—internal member to be articulable once inserted within external hollow member (such that external hollow member can move according to 360° about the extending cartridge centerline once the adaptor is mounted on the cartridge); 2—a connection between cartridge adaptor and its corresponding extending cartridge or cartridge extension such that rotation of the articulated adaptor also provides rotation of the extending cartridge (or the cartridge extension) about the cartridge centerline; and 3—a connection between the handle internal surface and its corresponding cartridge adaptor such that rotation of the hollow handle also provides rotation of the articulated adaptor about the cartridge center line. Therefore, the handle internal surface can be provided with outwardly extending projections while the outer surface of the external hollow member can be provided with longitudinal grooves as long as the projections can interface with the grooves so as to provide the rotation of the cartridge adaptor once the hollow handle is being rotated by the user. Moreover, the external surface of the internal hollow member can be provided with longitudinal grooves, while the internal surface of the external hollow member can be provided with outwardly extending projections, as long as the projections can interface with the grooves so as to provide rotation of the extending cartridge (or cartridge extension) once the cartridge adaptor is being rotated (upon rotation of the hollow handle by the user).

Now referring to FIGS. 9 to 12, in the non-limitative embodiment shown, trim 10 further comprises a temperature control mechanism 112 which is provided on first hollow handle 26. Temperature control mechanism 112 is being configured to interact with decorative outer frame 24 for controlling temperature of water coming out of thermostatic valve 12 using handle 26, as described in more detail below. In other words, the temperature control mechanism is provided, at least in part, on or in the handle, and is configured to interact with the decorative outer frame for controlling temperature of water coming out of the valve. The decorative outer frame and the handle thus comprise complementary temperature control components for setting at least one maximum water temperature through interaction of the complementary control components. The complementary temperature control components may also be configured for setting between two and four different pre-set water temperatures through interaction of the complementary control components.

Referring to FIGS. 9 to 13, the complementary temperature control components comprise an annular temperature control projection, comprising different segments 130, 132, extending outwardly from an inner face of the decorative outer frame. The annular projection comprising different sections for different temperature settings. A retractable element 120 is provided on the handle and can slide along the annular projection and be blocked by at least one segment thereof, corresponding to the maximal temperature setting.

Indeed, decorative outer frame 24 comprises a temperature control projection 114 which outwardly extends from mounting frame receiving surface 90 of decorative cover 74 and which is located about ring portion 110 in the non-limitative embodiment shown. Temperature control projection 114 defines a resistance section 116 as well as a locking section 118 for interacting with temperature control mechanism 112. Locking section 118 is spaced apart from resistance section 116. Temperature control projection 114 defines a first segment 130, a second segment 132 which substantially perpendicularly extends from first segment 130, and a third segment 134 which substantially perpendicularly extends from second segment 132. First and third segments 130, 134 follow peripheral edge 115 of ring portion 110.

Figure 11:
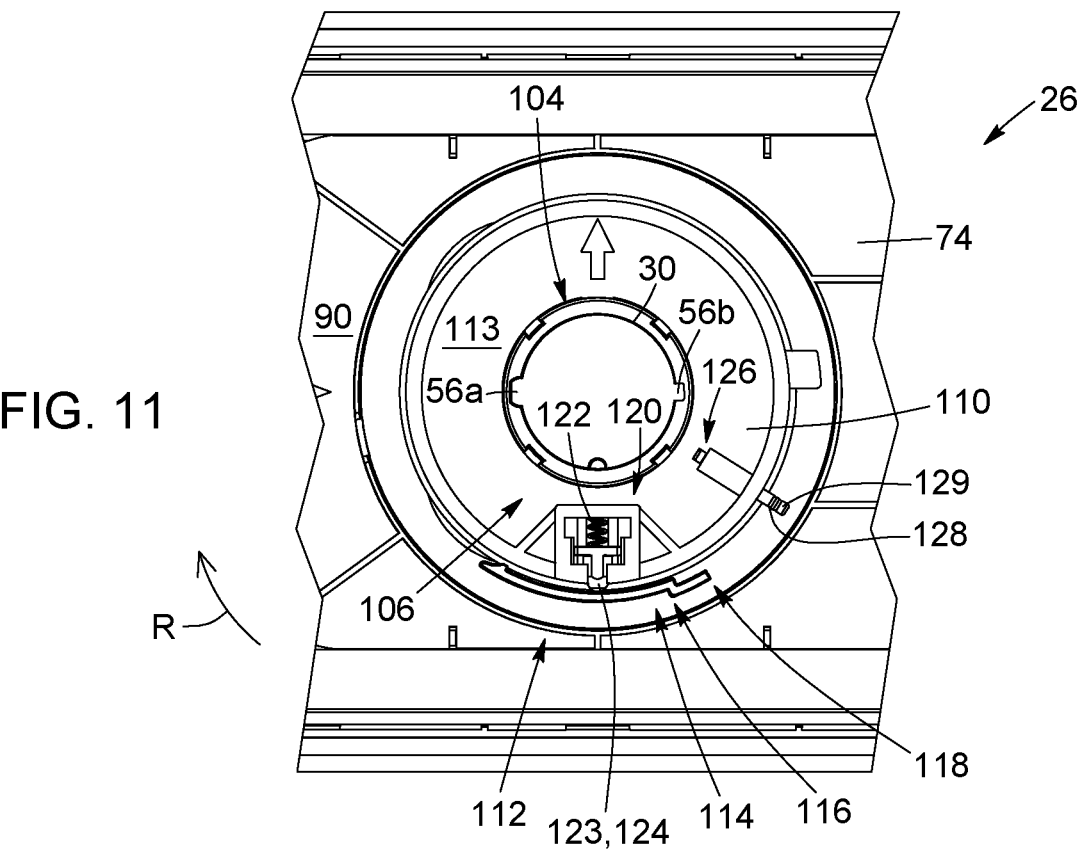
FIG. 11 is another closed-up view of the temperature control mechanism provided on one of the handles, where the mechanism is set to provide a third (yet higher) temperature.
Figure 12:
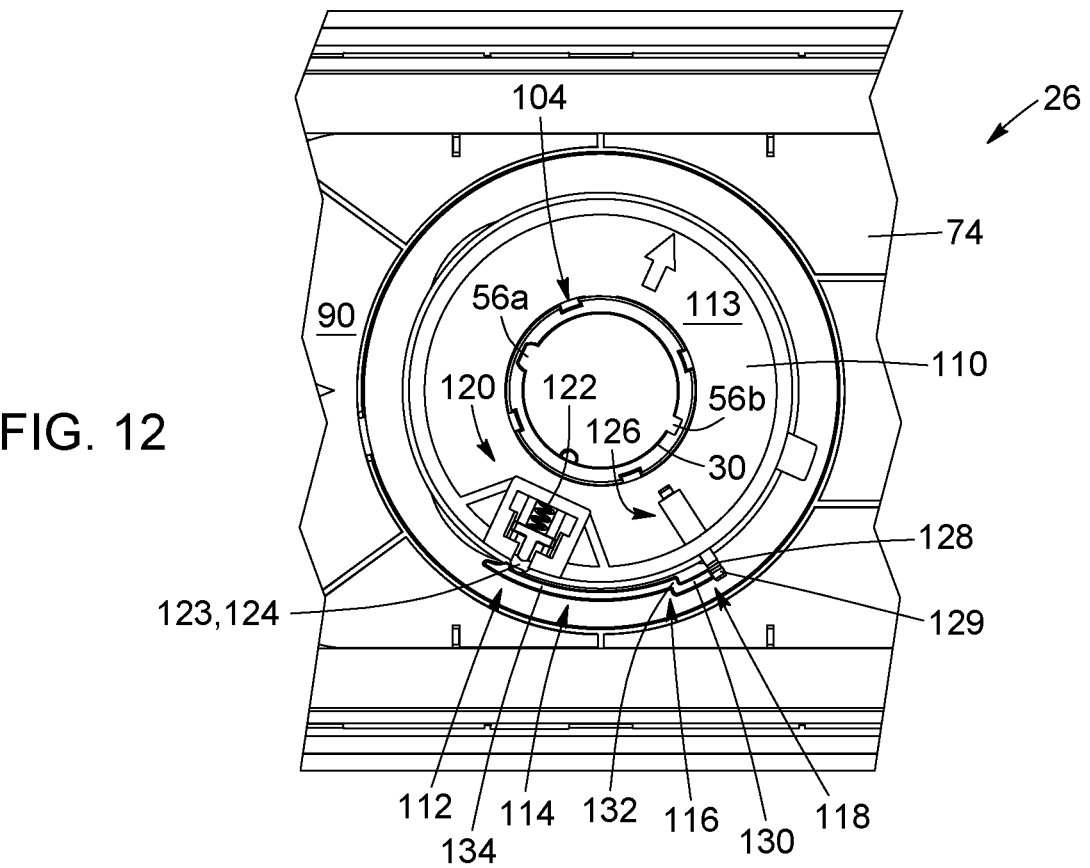
FIG. 12 is another closed-up view of the temperature control mechanism provided on one of the handles, where the mechanism is set to provide a fourth temperature (i.e., maximal temperature)

In the non-limitative embodiment shown, temperature control mechanism 112 comprises a first element 120 found within ring portion 110 for interacting with resistance section 116. First element includes a spring member 122 which outwardly and radially extends from ring portion 110. Spring member 122 defines an interfacing end 123. Spring member 122 is being adapted to be compressed from an initial configuration (FIGS. 9 and 10) to reach a partially or fully compressed configuration (FIGS. 11 and 12). First element 120 further comprises an abutment portion 124 at interfacing end 123 of spring member 122 for interfacing with resistance section 116 of temperature control projection 114. Temperature control mechanism 112 further comprises a second element 126 which is found within ring portion 110 for interacting with locking section 118. Second element 126 is being spaced apart from first element 120. Second element 126 comprises a rod 128 which outwardly and radially extends from ring portion 110. Rod 128 defines a locking end 129.

Figure 10:
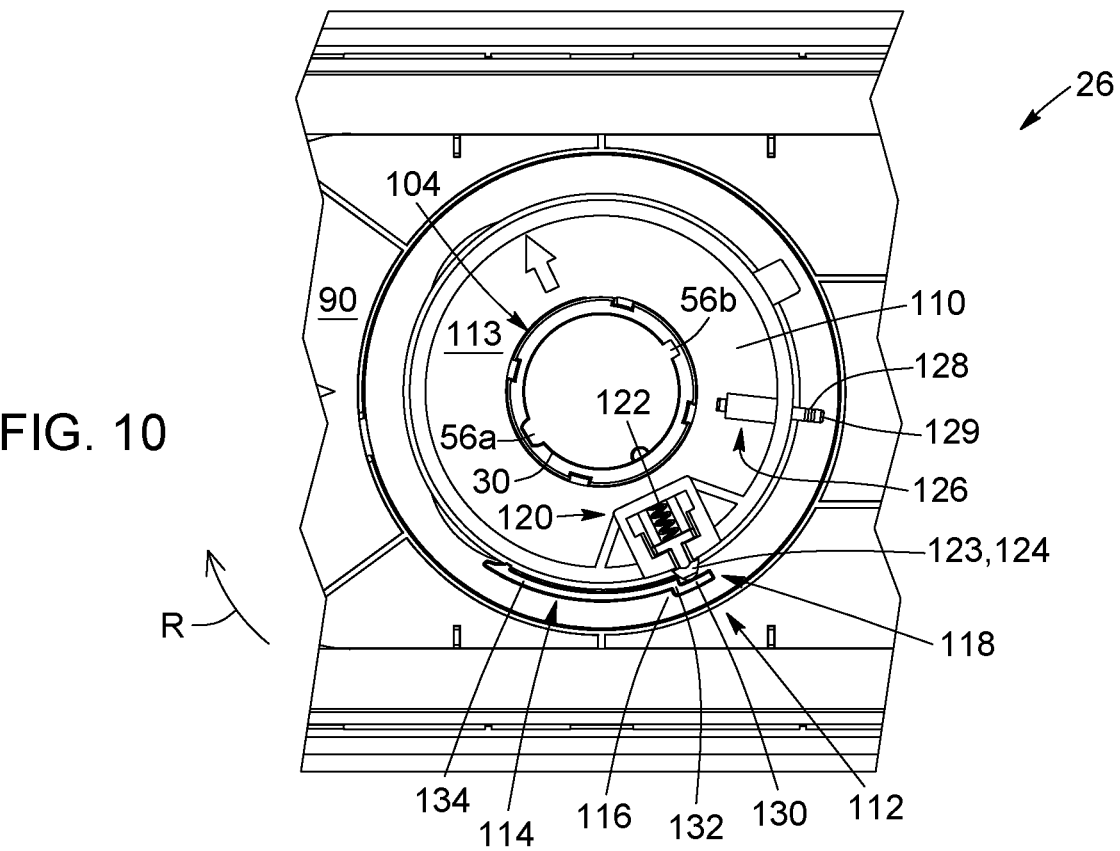
FIG. 10 is another closed-up view of the temperature control mechanism provided on one of the handles, where the mechanism is set to provide a second (higher) temperature.

In use, when providing hollow handle 26 to rotate, resistance will be provided when abutment portion 124 of first element 120 reach resistance section 116 of temperature control projection 114, which is found at the intersection of first and second segments 130, 132 (which corresponds to reaching a water temperature of 43° C. for example) (FIG. 10). When providing additional rotation to hollow handle 26 in rotation direction R, spring member 122 will compress once it has passed resistance section 116 to allow first handle 26 to pursue its rotation (FIG. 11). However, once rod end 129 of rod 128 abuts locking section 118 of temperature control projection 114, it will prevent hollow handle 26 to complete its rotation (which corresponds to reaching a water temperature of 54° C. for example) (FIG. 12). Should a user prefer unrestricted access to higher temperatures, rod 128 can easily be removed from ring portion 110.

For young children, or for increased safety in elderly residences, hospital environment or other similar regulatory frameworks, it would be possible for a user to restrict water temperature to a maximum of 43° C. for example, by providing a stopper element 214 (FIG. 26) to prevent spring member 122 to compress. As shown in FIG. 26, stopper element 214 can be found on ring portion 110 of second hollow handle 28 for example, within a corresponding cavity 125 provided thereon. According to the scenario illustrated in FIG. 26, spring member 122 is prevented from reaching a partially of fully compressed configuration.

It is however noted that temperature control projection 114 can be configured, shaped and/or sized differently, for example, a temperature control projection can alternatively extend from decorative surface 92 of decorative cover 74 so as to be located underneath first hollow handle 26 (not shown). The temperature control projection can therefore interface or cooperate with temperature control mechanism 112 so as to provide adjustment of the water temperature as defined above.

As shown in FIGS. 29 to 32, once adjustable covering trim 10 is installed on finishing wall 14 and interacts with hydrostatic valve 12 to provide rotation of the thermostatic and diverter controllers, it is easy to access valve 12 by lifting a corner of decorative cover 74 (FIGS. 30 and 31), allowing decorative cover 74 to detach or to be released from mounting frame 72 (which remains strongly coupled to finishing wall 14, thanks to adhesive material 80).

Adjustable covering trim 10 therefore provides interesting improvements. First, the fact that decorative cover 74 is releasably connectable to mounting frame 72 allows the user to easily access opening 136 (without any tool), while keeping weather tightness between trim 10 and wall 16. Maintenance or reparation of the valve can therefore be performed easily. Second, because articulable interfaces 34, 36 are provided between handles 26, 28 and finishing wall 16, and not behind finishing wall 16, a temperature control mechanism 112 can be provided directly on trim 10. This is important for example when children or the elderly have access to trim 10. According to mechanism 112, it can be harder to reach a water temperature of 43° C. for example, and even impossible to reach a water temperature over 48° C. Third, most importantly, articulated adaptors 34, 36 allow vertical as well as angular adjustment of the decorative outer frame 24, and the handles 26, 28 mounted thereon, relatively to the extending cartridges 16, 20, so that adjustable covering trim 10 can perfectly fits finishing wall 14 even if the extending cartridge(s) 16, 20 is/are not in a perfect perpendicular orientation relatively to finishing wall 14. Both the vertical and angular alignments are provided within hollow handles 26, 28.

Adjustable covering trim 10 is therefore quick to install on site, while providing a shower and/or a bathtub with a desired appearance than heretofore known. Trim 10 can also be configured so as to fit any concealed valve that is activated upon rotation.

Although the present invention has been described hereinabove by way of specific embodiments thereof, it can be modified, without departing from the spirit and nature of the subject invention defined in the appended claims.

The invention claimed is:

1. An adjustable covering trim for covering a valve concealed behind a finishing wall, the valve comprising an extending cartridge defining a cartridge distal end and a cartridge centerline extending therealong, the adjustable covering trim comprising:
    a decorative outer frame mountable on the finishing wall and configured to cover the valve;
    a handle rotatable relative to the decorative outer frame about an axis of rotation, the handle comprising internal longitudinal grooves; and
    an articulated cartridge adaptor comprising:
        a handle adaptor part slidably engaged in the handle; and
        a cartridge adaptor part mounted on the extending cartridge at the cartridge distal end such that both the cartridge distal end and the articulated cartridge adaptor can rotate with the handle upon rotation thereof, the cartridge adaptor part having an outer surface provided with protrusions;
        the handle adaptor part having an internal surface provided with adaptor grooves slidably receiving the cartridge adaptor protrusions therein and an external face provided with handle adaptor projections;
    the handle adaptor part and the cartridge adaptor parts being movable one relative to the other so as to compensate for a misalignment between the axis of rotation of the handle and the cartridge centerline, the articulated cartridge adaptor being articulable relative to the cartridge centerline, and
    the handle adaptor part having its projections slidably engaged in the handle longitudinal grooves,
    the handle being movable relative to the handle adaptor part along the axis of rotation of the handle via the complementary handle adaptor projections and the handle grooves, allowing depth adjustment of the handle relative to the decorative outer frame.

2. The adjustable covering trim according to claim 1, wherein the articulated cartridge adaptor is shaped and configured to allow, when in use, for the handle to rotate the extending cartridge of the valve even if the axis of rotation of the handle is at angle with the cartridge centerline.

3. The adjustable covering trim according to claim 1, wherein the handle adaptor part is an outer part and the cartridge adaptor part is an inner part, the cartridge adaptor part being entirely provided within the handle adaptor part and being movable relative thereto along the cartridge centerline.

4. The adjustable covering trim according to claim 3, wherein the handle adaptor part and the cartridge adaptor part are movable one relative to the other along at least three degrees of freedom.

5. The adjustable covering trim according to claim 3, wherein:
    the cartridge adaptor part comprises an internal hollow member defining an internal hollow member passage for receiving the cartridge distal end therein;
    the handle adaptor part comprises a body provided with the handle adaptor projections; and
    the cartridge adaptor part is received within the body of the handle adaptor part, the handle adaptor part and the cartridge adaptor part both fitting entirely within the handle.

6. The adjustable covering trim according to claim 5, wherein the handle adaptor part defines a handle adaptor centerline and the cartridge adaptor part defines a cartridge adaptor part centerline and further wherein the handle adaptor part is movable relatively to the cartridge adaptor part such that an angle is provided between the handle adaptor part centerline and the cartridge adaptor part centerline.

7. The adjustable covering trim according to claim 1, wherein:
    the handle is hollow and defines a handle internal surface on which the internal longitudinal grooves are provided; and the articulated cartridge adaptor is releasably coupled with the handle internal surface via the handle adaptor part and is releasably mounted to the distal end of the extending cartridge.

8. The adjustable covering trim according to claim 1, wherein the handle comprises:
   a hollow handle decorative cover;
   a sleeve received within the hollow handle decorative cover, the sleeve defining an outer end and an inner end; and
   a ring portion radially and outwardly extending from the inner end of the sleeve, the ring portion defining a cover interfacing surface, a valve interfacing surface and a peripheral edge joining the cover interfacing surface and the valve interfacing surface.

9. The adjustable covering trim according to claim 1, further comprising a temperature control mechanism provided on the handle, the temperature control mechanism being configured to interact with the decorative outer frame for controlling temperature of water coming out of the valve.

10. The adjustable covering trim according to claim 9, wherein the decorative outer frame and the handle comprise complementary temperature control components for setting at least one maximum water temperature through interaction of the complementary control components.

11. The adjustable covering trim according to claim 10, wherein the complementary temperature control components are configured for setting between two and four different pre-set water temperatures through interaction of the complementary control components.

12. The adjustable covering trim according to claim 10, wherein the complementary temperature control components comprise:
   an annular temperature control projection extending outwardly from an inner face of the decorative outer frame, the annular projection comprising different sections for different temperature settings; and
   a retractable element provided on the handle, which can slide along the annular projection and be blocked by at least one segment thereof, corresponding to the maximal temperature setting.

13. The adjustable covering trim according to claim 12, wherein the temperature control projection defines a resistance portion and a locking section for interacting with the retractable element, the locking section is spaced apart from the resistance section.

14. The adjustable covering trim according to claim 13, wherein the temperature control mechanism comprises a first element provided within the ring portion for interacting with the resistance section.

15. The adjustable covering trim according to claim 14, wherein the first element comprises a spring member outwardly and radially extending from the ring portion, the spring member defining an interfacing end, the spring member being adapted to be compressed between an initial configuration and a compressed configuration.

16. The adjustable covering trim according to claim 15, wherein the first element further comprises an abutment portion for interfacing with the resistance section.

17. The adjustable covering trim according to claim 13, wherein the temperature control projection defines a first segment, a second segment perpendicularly extending from the first segment, and a third segment extending from the second segment.

18. The adjustable covering trim according to claim 13, wherein the temperature control mechanism further comprises a second element found within the ring portion for interacting with the resistance section, the second element being spaced apart from the first element.

19. The adjustable covering trim according to claim 18, wherein the second element comprises a rod outwardly and radially extending from the ring portion, the rod defining a locking end.

20. The adjustable covering trim according to claim 1, wherein:
   the protrusions provided on the cartridge adaptor part are shaped and configured as curved fins; and
   the adaptor grooves provided on the handle adaptor part have a backwall on which the curved fins are configured to slide.

* * * * *